US006308258B1

(12) United States Patent
Kubota et al.

(10) Patent No.: US 6,308,258 B1
(45) Date of Patent: Oct. 23, 2001

(54) DATA PROCESSING CIRCUIT WITH TARGET INSTRUCTION AND PREFIX INSTRUCTION

(75) Inventors: Satoshi Kubota; Makoto Kudo; Yoshiyuki Miyayama, all of Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/717,152

(22) Filed: Nov. 22, 2000

Related U.S. Application Data

(62) Division of application No. 08/768,442, filed on Dec. 18, 1996, now Pat. No. 6,167,505.

(51) Int. Cl.[7] .................................................. G06F 15/00
(52) U.S. Cl. ................................... 712/210; 712/226
(58) Field of Search ................................... 712/210, 226, 712/208, 42

(56) References Cited

U.S. PATENT DOCUMENTS

| 3,657,705 | 4/1972 | Mekuta, Jr. et al. ............... 395/384 |
| 5,303,358 | 4/1994 | Baum ................................. 395/567 |
| 5,423,012 * | 6/1995 | Sato et al. .......................... 712/204 |
| 5,613,143 * | 3/1997 | Shimokawa ........................ 712/42 |
| 5,625,784 * | 4/1997 | Purcell ............................... 712/210 |

FOREIGN PATENT DOCUMENTS

| A2 0 113 178 | 7/1984 | (EP) . |
| 315139 * | 10/1989 | (EP) . |
| A2 0 489 266 | 6/1992 | (EP) . |

OTHER PUBLICATIONS

May et al. "The Transputer." *Neural Computers*, Sep. 28, 1997, pp. 477–486.
Dirac, J.F. "Control Word Expansion." IBM Technical Disclosure Bulletin, vol. 3, No. 7, Dec. 1960, p. 23.

* cited by examiner

*Primary Examiner*—Larry D. Donaghue
(74) *Attorney, Agent, or Firm*—Oliff & Berridge, PLC

(57) ABSTRACT

A certain target instruction and a prefix instruction for expanding the function of that target instruction are input to the present data processing circuit. The data processing circuit analyses the thus-input instruction code and performs the processing necessary for the execution of that instruction. The data processing circuit comprises an instruction decoder section, a register file, and an instruction execution section that executes the instruction based on operational details of the instruction analyzed by the instruction decoder section. The instruction decoder section comprises an ext instruction processing section that processed the expansion of immediate data from the prefix instruction.

19 Claims, 15 Drawing Sheets

FIG. 10A
OPERATION FOR TYPE-2 INSTRUCTION
rd = rs op. rd
FIG. 10B
OPERATION AND IMMEDIATE DATA FOR EXT INSTRUCTION PLUS TYPE-2 INSTRUCTION
rd = rs op. imm13
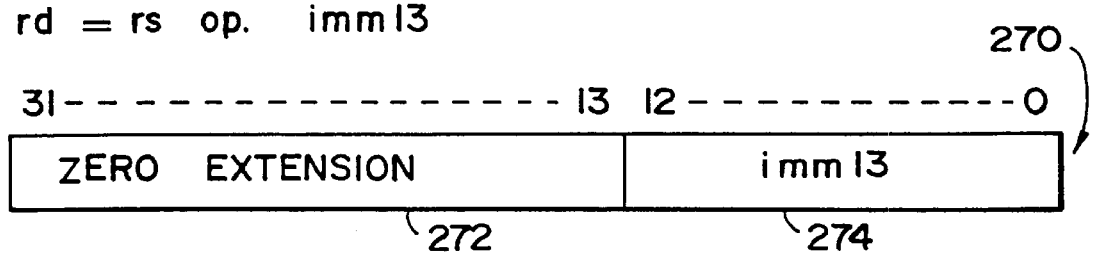
FIG. 10C
OPERATION AND IMMEDIATE DATA FOR EXT INSTRUCTION PLUS EXT INSTRUCTION PLUS TYPE-2 INSTRUCTION
rd = rs op. imm26
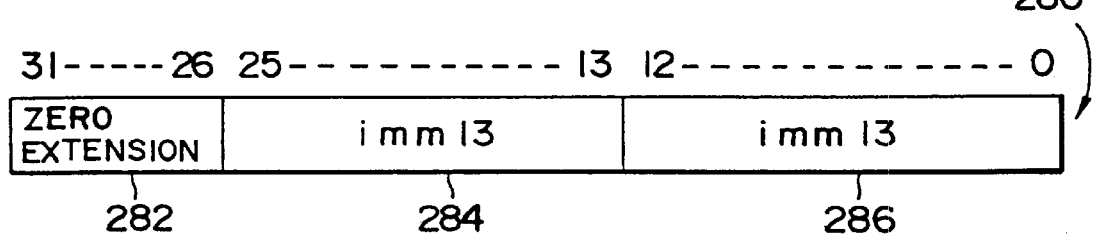

INDEPENDENT OPERATION FOR TYPE-3 INSTRUCTION

CALL sign 9

OPERATION AND IMMEDIATE DATA FOR EXT INSTRUCTION PLUS TYPE-3 INSTRUCTION

CALL sign 22

OPERATION AND IMMEDIATE DATA FOR EXT INSTRUCTION PLUS EXT INSTRUCTION PLUS TYPE-3 INSTRUCTION

CALL sign 32

DISPLACEMENT GENERATED BY EXT INSTRUCTION PLUS TYPE-4 INSTRUCTION

DISPLACEMENT GENERATED BY EXT INSTRUCTION PLUS EXT INSTRUCTION PLUS TYPE-4 INSTRUCTION

DATA PROCESSING CIRCUIT WITH TARGET INSTRUCTION AND PREFIX INSTRUCTION

This is a Division of application Ser. No. 08/768,442 filed Dec. 18, 1996, now U.S. Pat. No. 6,167,505. The entire disclosure of the prior application(s) is hereby incorporated by reference herein in its entirety.

BACKGROUND OF THE INVENTION

1. Field of the Invention

This invention relates to a data processing circuit and the semiconductor integrated circuit device, a microcomputer comprising such a data processing circuit, and electronic equipment comprising such a microcomputer.

2. Description of Related Art

At present, a Reduced Instruction Set Computer (RISC)-architecture microcomputer that is capable of handling 32-bit data uses instruction codes of a fixed 32-bit width. The use of fixed-length instruction codes makes it possible to shorten the time required for decoding the instructions, in comparison with an architecture that uses variable-length instruction codes, and it also enables a reduction in the size of the circuitry of the microcomputers.

However, a 32-bit width is not particularly necessary for many instruction codes, even in a 32-bit microcomputer. Therefore, if all the coding of instructions has to be written to fit a 32-bit width, many of the instructions will generate unnecessarily long portions in the coding, reducing the efficiency of memory usage.

In such a case, it is possible to compress unnecessarily long instruction codes by logical means and execute the instructions while decoding them on the fly within the microcomputer. However, this method raises a problem in that it requires complicated control circuitry.

The present inventors have therefore investigated the use of a microcomputer that handles fixed-length instruction codes of a bit width that is less than that of data that the microcomputer handles, in order to improve the efficiency of memory usage without using complicated control circuitry.

However, if, for example, 32-bit fixed-length instruction codes were simply converted into 16-bit fixed-length coding, the problem described below will arise.

Since each instruction code contains an operation code and operands other than immediate data, the number of bits of immediate data that can be used is much less than 16bits, even when 16-bit instruction codes are used. In other words, Ha the problem arises that less than 16bits of immediate data can be specified by an instruction code, regardless of whether the architecture can handle 32-bit data.

It is also difficult to ensure fields for the operands of a three-operand instruction with 16-bit instruction codes. This causes problems in that it is not clear how to handle operations that are difficult to express as such short instruction codes.

In order to solve the above described problem, it is necessary to have a function that can expand the immediate data comprises within short instruction codes, as necessary. It is also necessary to have a function that can expand operational details, in order to execute operations that cannot be written into short instruction codes.

SUMMARY OF THE INVENTION

An objective of this invention is to provide a data processing circuit, semiconductor integrated circuit device, microcomputer, and electronic equipment which are capable of expanding immediate data that is comprised within instruction codes, as necessary, without needing complicated control circuitry.

Another objective of this invention is to provide a data processing circuit, semiconductor integrated circuit device, microcomputer, and electronic equipment which are capable of expanding. operational details, without needing complicated control circuitry.

In order to achieve the above objectives, a first aspect of this invention relates to a data processing circuit to which are input a certain target instruction and a prefix instruction for expanding the function of the target instruction, comprising: instruction code analysis means for inputting the target and prefix instructions and analyzing the operational details of instruction code thereof; and instruction execution means for executing these instructions based on the operational details analyzed by the instruction code analysis means; the instruction code analysis means comprises immediate-data expansion means for expanding immediate data necessary for-the execution of the target instruction which is subjected to function expansion by the prefix instruction based on the prefix instruction; and the instruction execution means executes the target instruction based on immediate data expanded by the immediate-data expansion means.

The instruction code analysis means analyzes the input instruction codes and performs processing necessary for the execution of the instruction by the instruction execution means, such as calculating an address in the storage means for storing data that is manipulated by this instruction.

A target instruction and a prefix instruction that expands the function of that target instruction are input to the data processing circuit of this invention. The prefix instruction is not executed independently by the instruction execution means; its function is to expand the function of a subsequent target instruction when that instruction is executed.

The immediate-data expansion means expands the immediate data that is necessary for the execution of the target instruction, on the basis of the prefix instruction. This immediate data is the immediate data that will be necessary during the execution of the target instruction, such as immediate data comprised within the instruction code thereof or immediate data comprised within the instruction code of the prefix instruction.

In this case, the expansion of the immediate data could be ordinary zero extension or sign extension, a broadening of the bit width of the immediate data written in these instruction codes, or the addition of-certain bits thereto. In other words, this aspect of the invention makes it possible to expand immediate data by the addition of certain bits, as specified by a prefix instruction.

Thus it is possible to set the number of bits of the instruction code to be small, even when it includes immediate data that tends to increase the number of bits of instruction code. This enables an improvement in the efficiency with which memory is used, with a simple structure that uses shorter fixed-length instruction codes but without requiring complicated control circuitry that would otherwise be required for variable-length instruction codes.

The data processing circuit in accordance with a second aspect of this invention has an architecture such that fixed-length instruction codes are input and executed thereby.

The use of fixed-length instruction codes in this aspect of the invention makes it possible to shorten the time required for decoding the instructions, in comparison with processing involving instruction codes of a variable bit length, and also reduce the size of the data processing circuitry.

Since immediate data can be expanded by prefix instructions, the immediate data, which often tends to lengthen the instruction codes, can be made shorter. Since the size of the fixed-length instruction codes can therefore be reduced, unnecessarily verbose-parts of the instruction coding can be cut efficiently, enabling improvements in the efficiency with which memory is used, particularly in how instruction codes are stored in memory.

In the data processing circuit in accordance with a third aspect of this invention, the bit width of the fixed-length instruction codes is less than or equal to the bit width of data or addresses that can be processed by the data processing circuit.

Even when the bit width of the instruction codes is set to be less than the bit width of data or addresses that can be processed by the data processing circuit, this aspect of the invention makes it possible to expand immediate data to the bit width that can be processed by the data processing circuit. Since the bit width of the instruction codes can thus be set to less than the bit width of data or addresses that can be processed by the data processing circuit, the efficiency with which memory is used can be improved.

The data processing circuit in accordance with a fourth aspect of this invention is configured to input fixed-length instruction codes of a 16-bit width; the immediate-data expansion means expands the immediate data necessary for the execution of the target instruction to a 32-bit width based on the prefix instruction; and the instruction execution means comprises arithmetic and logic calculation means for executing the target instruction, using the 32-bit immediate data expanded by the immediate-data expansion means.

In the prior art, a RISC-architecture microcomputer that can handle 32-bit data uses fixed-length 32-bit instruction codes in the execution of instructions. However, many of these instruction codes do not particularly need 32 bits, which leads to a deterioration in the efficiency with which memory is used.

An instruction code is usually configured of class code and operation code that specified the basic operation of that instruction, as well as operands other than immediate data. In this case, operands other than immediate data include codes corresponding to a source register (rs) and destination register (rd), for example. Thus if 16-bit instruction codes are used, the number of bits of immediate data that can actually be used is further reduced, usually to about six bits. In general, the shorter the instruction code, the more difficult it is to guarantee a bit width for immediate data. With this aspect of the invention, however, immediate data can be expanded so that instruction codes-as short as 16bits long can be used even in a data processing circuit capable of handling 32-bit data. This enables-a huge improvement in the efficiency with which memory is used.

In the data processing circuit in accordance with a fifth aspect of this invention, the immediate-data expansion means expands immediate data comprised within the instruction code of the target instruction based on immediate data in the instruction code of the prefix instruction and immediate data in the instruction code of the target instruction.

When immediate data comprised within the instruction code of a target instruction is to be expanded, this simple structure makes it possible to specify part of the immediate data necessary for the execution of the target instruction is specified as immediate data in the instruction code of the target instruction and the remainder of the immediate data necessary for the execution of the target instruction as immediate data in the instruction code of the prefix instruction.

This makes it possible to shorten the number of bits of immediate data in each instruction code and thus improve the efficiency with which memory is used.

In the data processing circuit in accordance with a sixth aspect of this invention, the immediate-data expansion means uses immediate data comprised within the instruction code of the prefix instruction to expand data to be used in the execution of the target instruction.

In this case, the concept of data differs from that of an address in that the value thereof indicates an item that is not an address. Data used in the execution of a target instruction is immediate data comprised within the instruction code of the target instruction itself and immediate data that is used during the execution but is not comprised within the instruction code of the target instruction. This makes it possible to use expanded immediate data to execute target instructions, but with a simple structure.

In the data processing circuit in accordance with a seventh aspect of this invention, the immediate-data expansion means uses immediate data comprised within the instruction code of the prefix instruction to expand an address to be used in the execution of the target instruction.

In this case, the concept of an address differs from that of data in that the value thereof is information indicating a specific position or location within a storage device. Addresses used in the execution of a target instruction are addresses within immediate data that is comprised within the instruction code of the target instruction itself and addresses in immediate data that are-used during the execution but are not comprised within the instruction code of the target instruction. This makes it possible to use expanded addresses to execute target instructions, but with a simple structure.

In the data processing circuit in accordance with an eighth aspect of this invention, the immediate-data expansion means uses immediate data comprised within instruction codes of a plurality of prefix instructions to expand the immediate data necessary for the execution of the target instruction which is subjected to function expansion by the prefix instruction.

This configuration makes it possible to expand the immediate data necessary for the execution of the target instruction to any desired length, by using a combination of immediate data from a plurality of prefix instructions. Thus execution that uses large amounts of immediate data can be handled, even when short instruction codes are used, so that the disadvantages involved in shortening the instruction codes can be avoided.

In the data processing circuit in accordance with a ninth aspect of this invention, common code for identifying prefix instructions is comprised within the instruction code of each of the plurality of prefix instructions.

This aspect of the invention makes it unnecessary to provide a plurality of different types of prefix instruction. This means that immediate data-can be expanded without having to allocate other types of instruction, even in a data processing circuit that handles instruction codes having a small number of bits.

In the data processing circuit in accordance with a tenth aspect of this invention, the immediate-data expansion means comprises a processing state storage means for storing a processing state determined based on the number of sequentially input prefix instructions; data holding means for holding the immediate data of the thus input prefix instructions in first to mth registers where m is an integer greater than 1 based on the processing state stored in the processing state storage means; and means for expanding and creating immediate data necessary for the execution of the target instruction based on immediate data held in the first to mth registers of the data holding means.

In this case, the processing state determined on the basis of the number of sequentially input prefix-instructions could be determined on the number of sequential inputs thereof, or it could be deduced uniquely from special rules based on the number of sequential inputs. If, for example, three or more prefix instructions are input in sequence, the configuration could be such that the third and subsequent instructions are always handled under the same processing state. The immediate data of the prefix instruction can thus be held in the immediate-data holding means with reference to the thus-determined processing state, so that immediate data can be expanded by combining these held items of immediate data. In this manner, the immediate data necessary for the execution of the target instruction can be expanded within a simple structure, based on the number of prefix instructions that are input in sequence.

In the data processing circuit in accordance with an eleventh aspect of this invention, the instruction code analysis means comprises target instruction function expansion means for analyzing operational details of a target instruction when the target instruction is input after the input of a prefix instruction; and the instruction execution means executes the target instruction in accordance with the operational details expanded by the target instruction function expansion means.

This makes it possible to expand the function of a target instruction by executing it in combination with a prefix instruction. This enables a reduction in the number of instructions and also enables a reduction in the number of bits used in the instruction code.

The use of instruction coding with a smaller number of bits makes it possible to implement functions that would otherwise be difficult to provide, by combining a prefix instruction and a target instruction. This shortening of the instruction codes also enables an improvement in the efficiency with which memory is used.

In the data processing circuit in accordance with a twelfth aspect of this invention, the target instruction function expansion means uses the two operands of the target instruction and immediate data comprised within the prefix instruction to expand the operational details of the target instruction into a three-operand instruction, when a predetermined target instruction that is a two-operand instruction is input after the input of a prefix instruction,.

This makes it possible to expand the operational functions of a two-operand instruction to those of a three-operand instruction by combining that two-operand instruction as a target instruction with a prefix instruction. Thus a three-operand instruction can be implemented when using instruction codes that are so short, they can only contain regions for defining two operands. Thus the number of instructions and the number of bits used in instruction codes can be reduced.

Since immediate data can also be expanded by the prefix instruction to implement a three-operand instruction, a comparatively large amount of immediate data can be handled for the execution of a three-operand instruction, but with an ordinary instruction.

In the data processing circuit in accordance with a thirteenth aspect of this invention, the target instruction function expansion means modifies one of data and an-address stored in a register comprised within the instruction code of the target instruction based on immediate data specified by the instruction code of the prefix instruction so as to expand the operational details for execution, when a predetermined target instruction having a register-specifying value is input after the input of a prefix instruction.

In this case, the modification of an address or data means the execution of a process such as an arithmetic calculation, a logic calculation, or a shift. By executing a target instruction in combination with a prefix instruction, data or an address stored in a register specified by the instruction code of the target-instruction can be modified by immediate data specified by the instruction code of the prefix instruction. Thus the number of instructions and the number of bits used in instruction codes can be reduced.

In the data processing circuit in accordance with a fourteenth aspect of this invention, the target instruction function expansion means creates a displacement for an address stored in a register specified in the instruction code of the target instruction based on immediate data comprised within the instruction code of the prefix instruction and uses this displacement to expand operational details for execution, when a predetermined target instruction having a register-specifying value is input after the input of a prefix instruction.

This makes it possible to use a prefix instruction to create a displacement for an address during execution.

The use of a prefix instruction also makes it possible to add a displacement without limiting the number of bits in an operand.

In the data processing circuit in accordance with a fifteenth aspect of this invention, the instruction code analysis means comprises a prefix instruction function expansion means for expanding the operational details of the prefix instruction based on the number of sequentially input prefix instructions.

In this cases if there is a plurality of different types of prefix instruction, the operational details of a prefix instruction can also be expanded on the basis of the number of sequentially input prefix instructions of the same type. In this context, the same type of prefix instruction means prefix instructions that have the same operational details. Therefore, if a plurality of types of prefix instruction are available, with the functions thereof differing by means such as the operation code, the same-type of prefix instruction has the same operation code.

This makes it possible to modify the operational details of a prefix instruction on the basis of the number of times prefix instructions are input, so that a larger number of functions can be implemented with a few types of prefix instruction.

The data processing circuit in accordance with a sixteenth aspect of this invention further comprised instruction code storage means for storing instruction codes that are input to the instruction code analysis means.

This configuration makes it possible to store instruction coding that is short and has few unnecessarily verbose portions, enabling the implementation of a data processing device which uses memory efficiently. Therefore, if a large number of instructions are of the same size it is possible to provide a data processing device that can store them, and, if they also have the same functions, a smaller memory capacity can be implemented.

A semiconductor integrated circuit device in accordance with this invention comprises the data processing circuit of this invention.

This aspect of the invention makes it possible to provide a sophisticated semiconductor integrated circuit device that has a compact circuit configuration.

A microcomputer in accordance with this invention comprises the data processing circuit of this invention.

This aspect of the invention makes it possible to provide a microcomputer that has a simple structure and uses memory efficiently.

The microcomputer of this invention could also have a RISC architecture.

The objectives of a RISC microcomputer are to shorten the time required for decoding instructions by the use of short, fixed-length instruction codes, and reduce the size of the circuitry thereof. This aspect of the invention makes it possible to provide a RISC-architecture microcomputer that achieves these objectives.

Electronic equipment in accordance with this invention is controlled by the use of the microcomputer of this invention.

This aspect of the invention makes it possible to incorporate into electronic equipment a data processing circuit that has a simple structure and uses memory efficiently, thus providing sophisticated but inexpensive electronic equipment.

BRIEF DESCRIPTION OF THE DRAWINGS

FIGS. 10A to 10C illustrate equations that express operations of type-2 instructions and the bit fields of immediate data used in the execution of these operations;

DESCRIPTION OF PREFERRED EMBODIMENTS

Embodiment 1

1. CPU Functions

Figure 1:
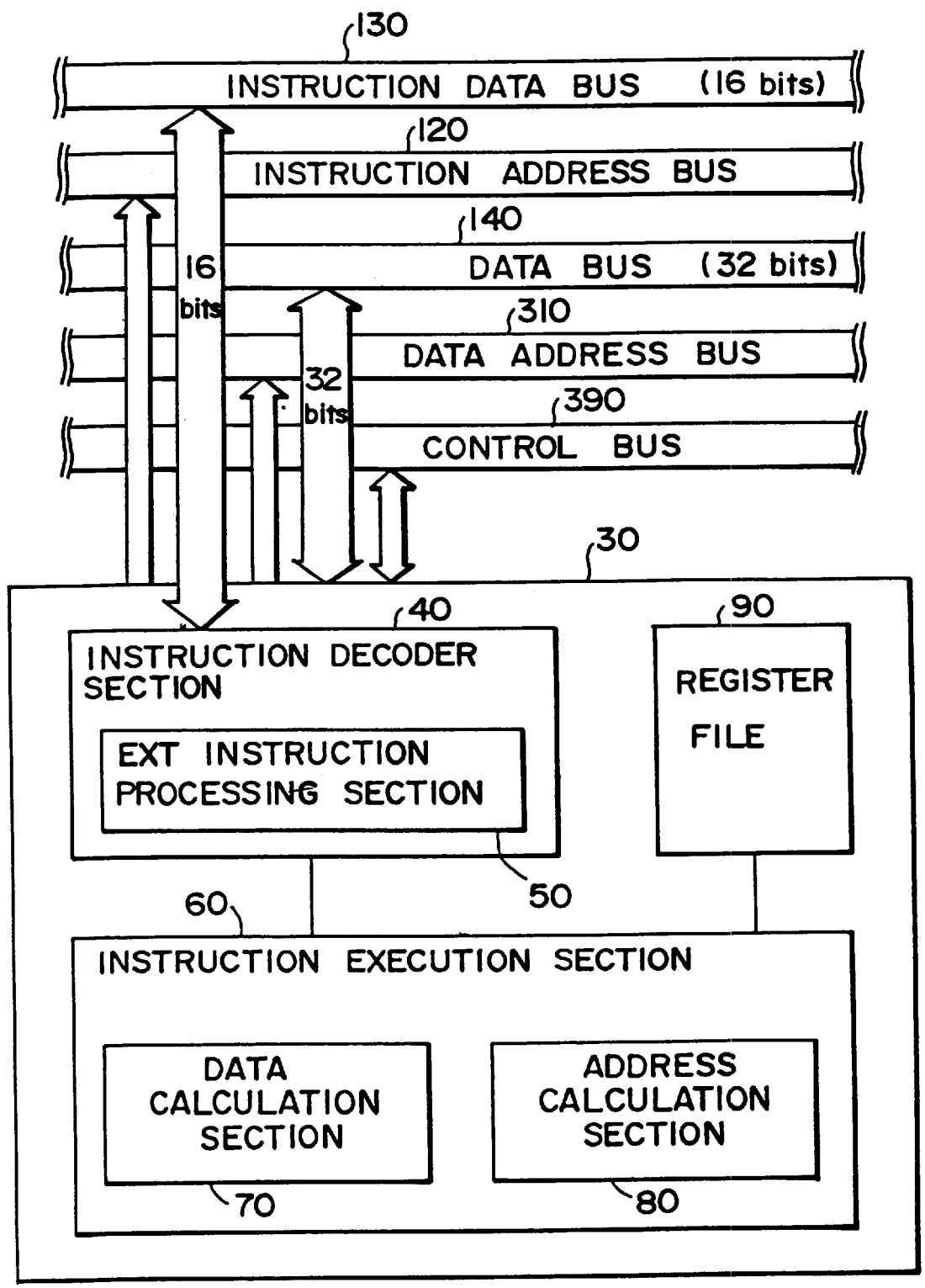
FIG. 1 is a functional block diagram of a CPU of a first embodiment of this invention.

A functional block diagram of the CPU in accordance with a first embodiment of this invention is shown in FIG. 1. A CPU 30 is configured in such a manner that it handles 32-bit width data but processes 16-bit instruction codes.

This CPU 30 comprises an instruction decoder section 40, an instruction execution section 60, and a register file 90. The CPU 30 exchanges signals with other parts of the circuit through a 16-bit instruction data bus 130, an instruction address bus 120 for accessing instruction data, a 32-bit data bus 140, a data address bus 310 for accessing data, and a control bus 390 for control signals.

The instruction decoder section 40 comprises an ext instruction processing section 50 which is a characteristic feature of this invention. The instruction decoder section 40 decodes each instruction code that is input to the CPU and performs processing necessary for the execution of that instruction. The register file 90 comprises registers used by the CPU, such as 16 general registers R0 to R15, a program counter (PC), a processor status register (PSR), a stack pointer (SP), an arithmetic low register (ALR), and an arithmetic high register (AHR). The instruction execution section 60 executes each instruction on the basis of the operational details for that instruction, as decoded by the instruction decoder section 40. The instruction execution section 60 comprises a data calculation section 70 for calculating data and an address calculation section 80 for calculating addresses.

Since the data width of the architecture within the CPU is 32 bits, all of the arithmetic and logic calculations performed by the data calculation section 70 and address calculation section 80 of the instruction execution section 60, as well as the width of data transferred between the registers of the register file, is 32 bits. However, the instruction codes handled by the CPU 30 have a fixed width of 16bits. In other words, instruction codes of a fixed width of 16bits are stored in an instruction code storage portion (not shown in the figure) that is connected to the CPU by the instruction data bus and instruction address bus. This means that the number of valid bits of immediate data in one instruction is that number of bits minus the number of bits required for the class code and the operation code of that instruction. Thus the number of bits of valid immediate data within an instruction is limited to a comparatively short bit length of, for example, six to eight bits.

A characteristic feature of this embodiment is the novel provision of an instruction of a fixed width of 16bits, called an ext instruction, which is configured in such a manner that the bit width of the immediate data can be extended by using that instruction. Use of the ext instruction makes it possible to perform operations that cannot be coded into instructions of the narrow width of 16bits.

An ext instruction itself does not execute any operation independently by the CPU, but it is used as a prefix instruction that acts to expand the function of another instruction that is placed immediately after it. Note that the instruction whose function is extended by this prefix instruction is called a target instruction.

This ext instruction is processed by the ext instruction processing section 50, which will be described in more detail later.

2. Configuration of Semiconductor Integrated Circuit

The description now turns to an example of a circuit configuration for implementing the characteristic function of this invention, illustrated by a semiconductor integrated circuit installed within a microcomputer, and details of the operation thereof.

Figure 2:
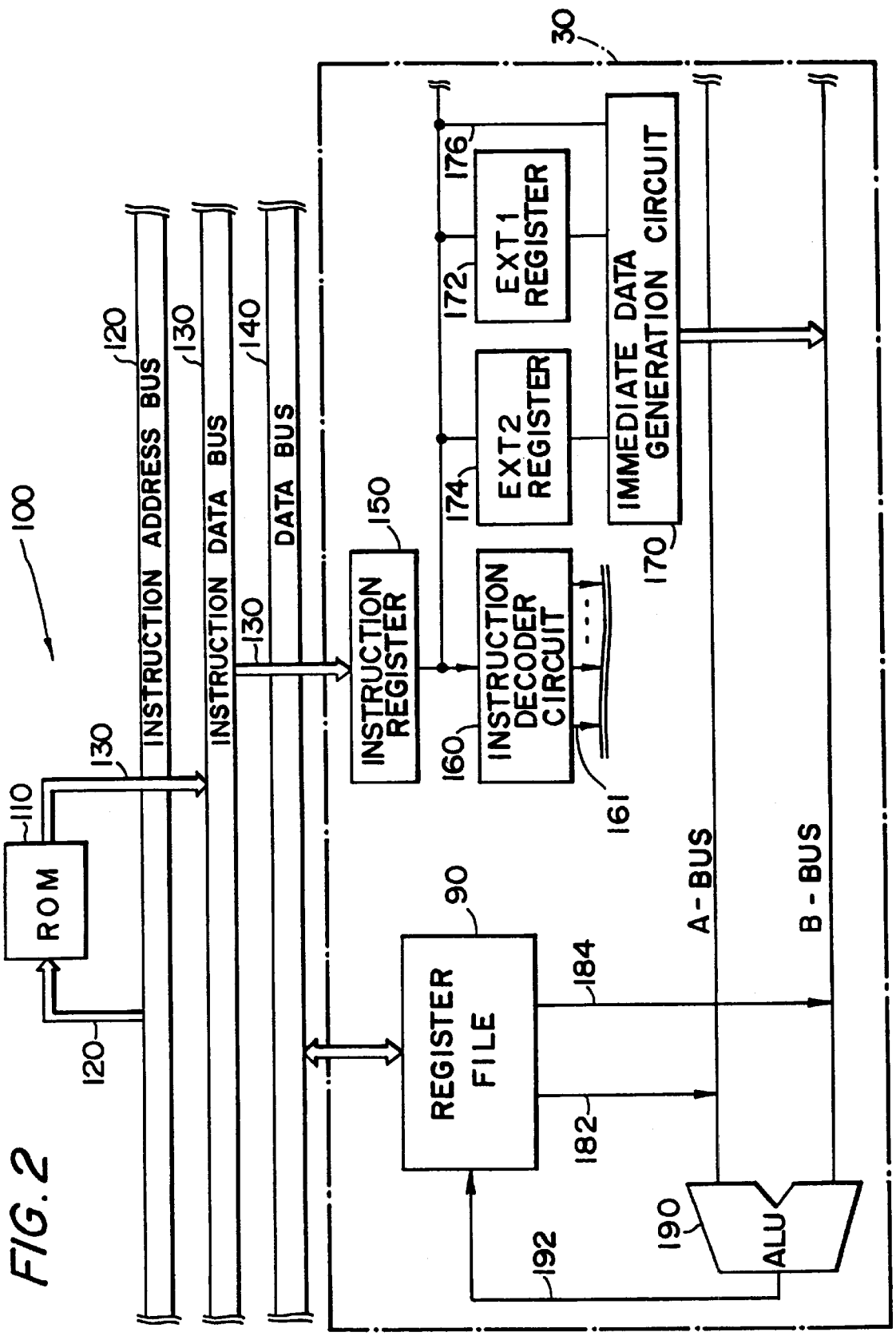
FIG. 2 shows portions essential for the description of the configuration of a semiconductor integrated circuit incorporated in a microcomputer.

Portions that are necessary for this description of the configuration of the semiconductor integrated circuit incorporated into the microcomputer are shown in FIG. 2. This semiconductor integrated circuit 100 comprises the CPU 30, a ROM 110, and RAM that is not shown in the figure. The CPU 30 transfers signals between other parts of the circuit and the ROM 110 and the RAM (not shown in the figure), over the 16-bit instruction data bus 130, the instruction address bus 120 for accessing that instruction data, and the 32-bit data bus 140.

The ROM 110 functions as an instruction code storage means for storing 16-bit instruction codes that specify the processing which the CPU 30 is to execute. Instruction codes for the prefix instruction and the instruction that is the target thereof are stored in the ROM 110 in the same manner as the instruction codes for standard instructions.

The CPU 30 comprises an instruction register 150, an instruction decoder circuit 16Q, an immediate data generation circuit 170, an EXT1 register 172, an EXT2 register 174, the register file 90, and an arithmetic logic unit (ALU) 190.

The instruction register 150 stores instruction codes that are input from the ROM 110 via the instruction data bus 130. The instruction decoder circuit 160 decodes each instruction stored in the instruction register 150, and outputs control signals necessary for the execution of that instruction. The instruction decoder circuit 160 also separates immediate data from the instruction codes, holds the data if-necessary in the EXT1 and EXT2 registers 172 and 174, then outputs the data to the immediate data generation circuit 170.

The immediate data generation circuit 170 uses the immediate data that is output from the instruction decoder circuit 160 and the immediate data that is held in the EXT1 and EXT2 registers 172 and 174 to create immediate data that is extended to 32 bits wide. In other words, the instruction decoder circuit 160, the immediate data generation circuit 170, the EXT1 register 172, and the EXT2 register 174 function as the instruction decoder section 40 and ext instruction processing section 50 shown in FIG. 1.

The ALU 190 performs arithmetic calculations, logical calculations, and shift calculations with respect to this expanded immediate data, values stored in registers within the register file 90, and main storage media (not shown in the figure). In other words, the ALU 190 functions as the data calculation section 70 of the instruction execution section 40 shown in FIG. 1.

The configuration which creates the expanded immediate data, which is the characteristic function of this invention, will now be described. The immediate data of this invention has many different patterns, but the description of this embodiment takes as an example an expansion that uses the immediate data of a prefix instruction to increase the number of bits of immediate data of the subsequent target instruction.

The instructions that can be handled by this microcomputer can be divided into two categories: standard instructions and prefix instructions. Any predetermined instruction within the standard instructions can become the target of a prefix instruction (an instruction that is the target of a prefix instruction is called a target instruction).

Since this microcomputer uses 16-bit fixed-width instruction codes, it is only possible to ensure about six bits for each field specifying immediate data within one of these standard instructions, as will be described later.

However, during execution by the ALU 190 and other components, the data width is 32 bits so that immediate data that has been expanded to 32 bits is generated by the immediate data generation circuit 170 and is input to the ALU 190. In such a case, there are two types of ordinary bit expansion: a zero extension by which all of the 26 bits above the 6-bit field become zero; and a sign extension by which the value of the highest order bit of the 6-bit field is expanded. However, such an expansion means that it is not possible to handle immediate data that has large numbers of meaningful bits, even though the CPU can handle 32-bit calculations. That is why this embodiment is configured in such a manner the immediate data of the prefix instruction can be used to increase the number of bits in the immediate data of the subsequent target instruction. This expansion is implemented by means for holding immediate data that is comprised within the instruction code of the prefix instruction and means for increasing the number of bits of immediate data, on the basis of the thus-held immediate data.

The description first relates to the means for holding the immediate data comprised within the instruction code of the prefix instruction. The holding means has a state machine (not shown in the figure) within the instruction decoder circuit 160. A status set by this state machine determines whether the instruction processed by the instruction decoder circuit 160 is processed as a prefix instruction or a standard instruction. The instruction decoder circuit 160 places the immediate data of the prefix instruction in the EXT1 and EXT2 registers 172 and 174 on the basis of the status set by the state machine. The immediate data generation circuit 170 uses the immediate data held in the EXT1 and EXT2 registers 172 and 174 on the basis of the status set by the state machine, to generate expanded immediate data. Note that the holding means could equally well be latch circuits, instead of registers.

It should be noted that the prefix instruction used by the microcomputer of this embodiment is merely a type of ext instruction, as will be described later, and the instruction code of this ext instruction comprises 13 bits of immediate data.

Figure 3:
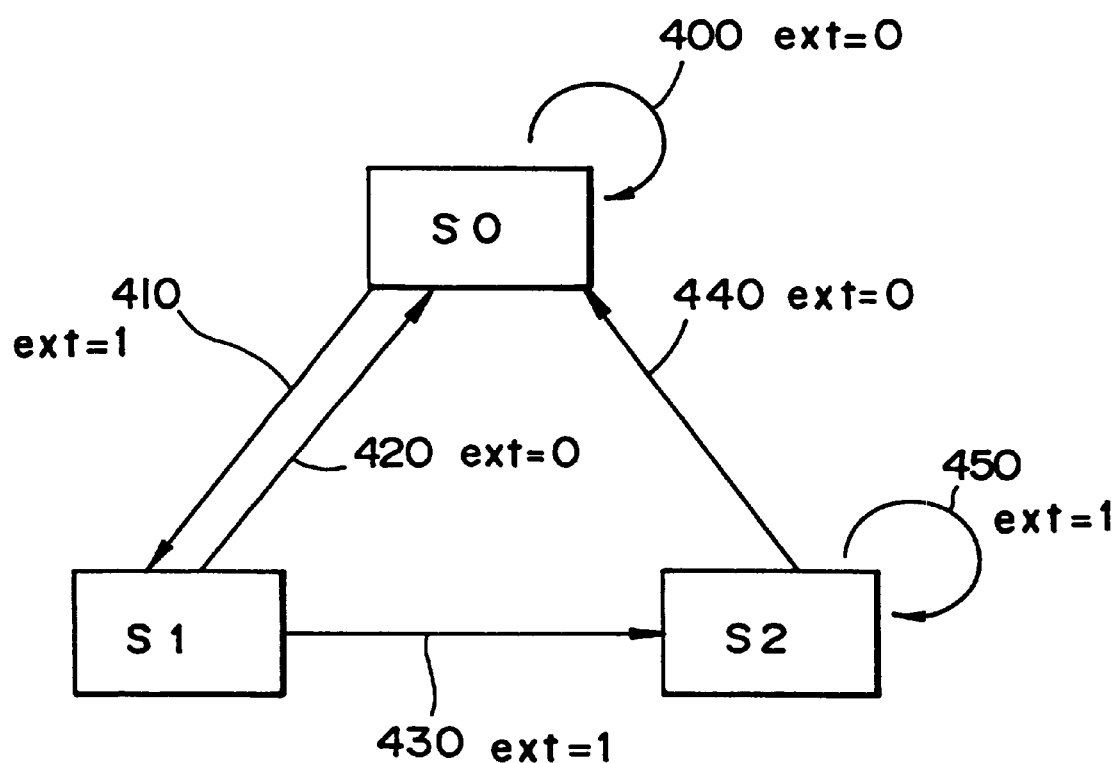
FIG. 3 shows transitions in the status of a state machine within an instruction decoder circuit.

Transitions in status as set by the state machine within the instruction decoder circuit 160 are shown in FIG. 3. This state machine can hold any of three statuses: S0, S1, and S2. Status S0 indicates the input of a standard instruction that is not an ext instruction (prefix instruction), status Si indicates the input of a first ext instruction (prefix instruction), and status S2 indicates the input of a second ext instruction (prefix instruction).

As shown in FIG. 3, when the status of the state machine is S0, the status either stays at S0 (400) if another standard instruction (ext=0) is input or it changes to S1 (410) if an ext instruction (ext=1) is input. If the status of the state machine is S1, the status either changes to S0 (420) if a standard instruction (ext=0) is input or it changes to S2 (430) if an ext instruction (ext=1) is input. If the status of the state machine is S2, the status either changes to S0 (440) if a standard instruction (ext=0) is input or it stays at S2 (450) if another ext instruction (ext=1) is input.

In other words, this state machine is configured to make the status S0 if a standard instruction is input or hold the status at S2 if a sequence of two or more ext instructions input, until a standard instruction is input again.

Figure 4:
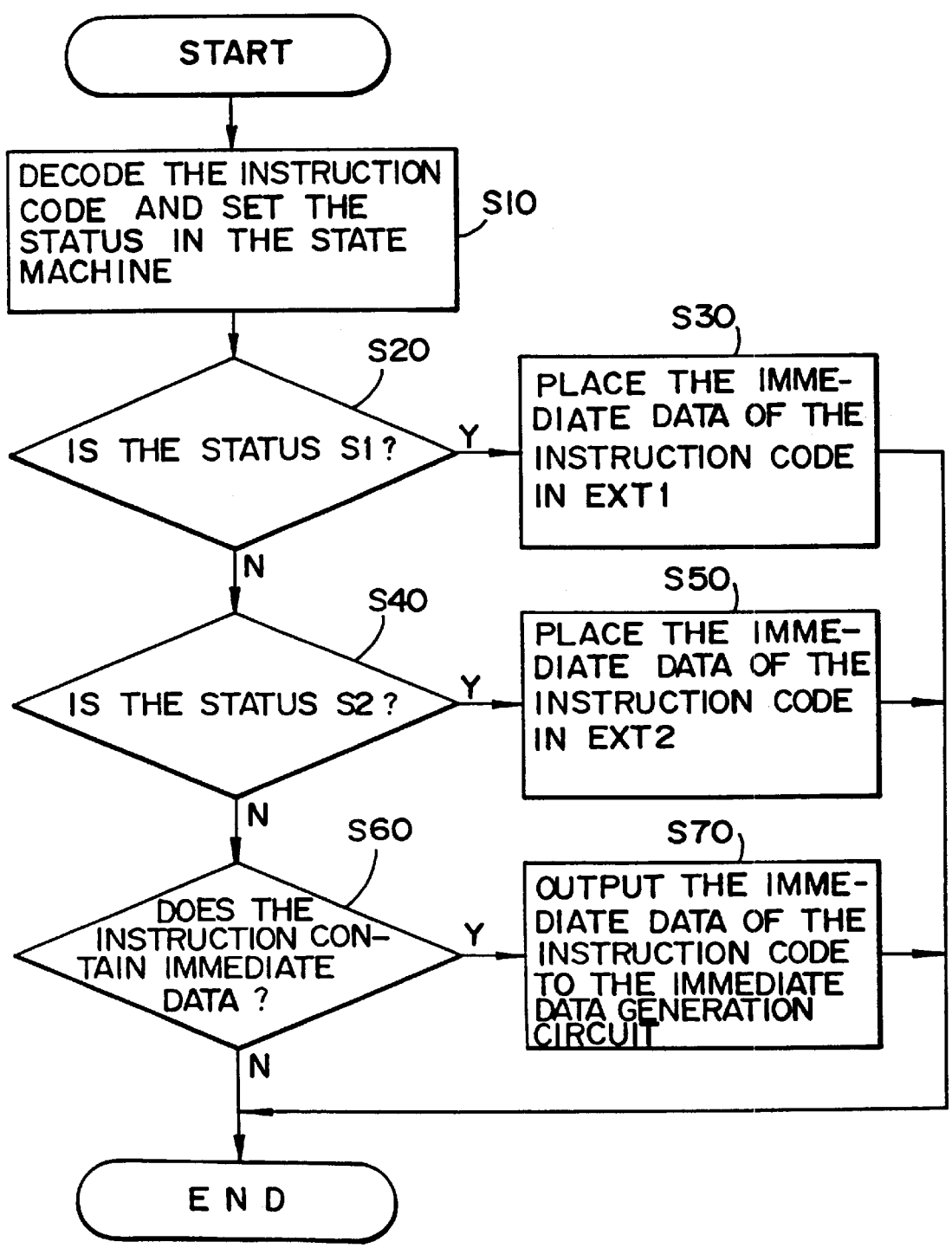
FIG. 4 is a flowchart of the algorithm used by the instruction decoder circuit for the holding of immediate data.

A flowchart of the algorithm used by the instruction decoder circuit 160 for the holding of immediate data is shown in FIG. 4.

First of all, the instruction decoder circuit 160 decodes the instruction code that has been input to the instruction register, then sets the status of the state machine depending on the current status of the state machine and whether or not that instruction code is an ext instruction (step 10).

If the status of the state machine is S1 (step 20), it means that a first ext instruction has been input and therefore the instruction decoder circuit 160 places the 13-bit immediate data of the first ext instruction in the EXT1 register 172 (step 30).

If the status of the state machine is S2 (step 40), it means that a second or subsequent ext instruction has been input in sequence and therefore the instruction decoder circuit 160 places the 13-bit immediate data of that input ext instruction in the EXT2 register 174 (step 50). This means that, if three or more ext instructions are input in sequence, the immediate data of the newest ext instruction will be overwritten into the EXT2 register. Therefore only the immediate data of the initial ext instruction and the final ext instruction of a sequence of ext instructions will be valid. All intermediate ext instructions are ignored.

If the status is S0, meaning that a standard instruction has been input, the instruction decoder circuit 160 determines whether or not the instruction code of that instruction contains immediate data (step 60). If there is immediate data, that immediate data is output to the immediate data generation circuit 170 (step 70).

The means for increasing the number of bits of the immediate data on the basis of the held immediate data will now be described. This increasing means is a signal generation circuit for the generation of immediate data (not shown in the figure) within the immediate data generation circuit 170. Expanded immediate data is generated on the basis of an immediate data generation signal created by this signal generation circuit for the generation of immediate data.

Figure 5:
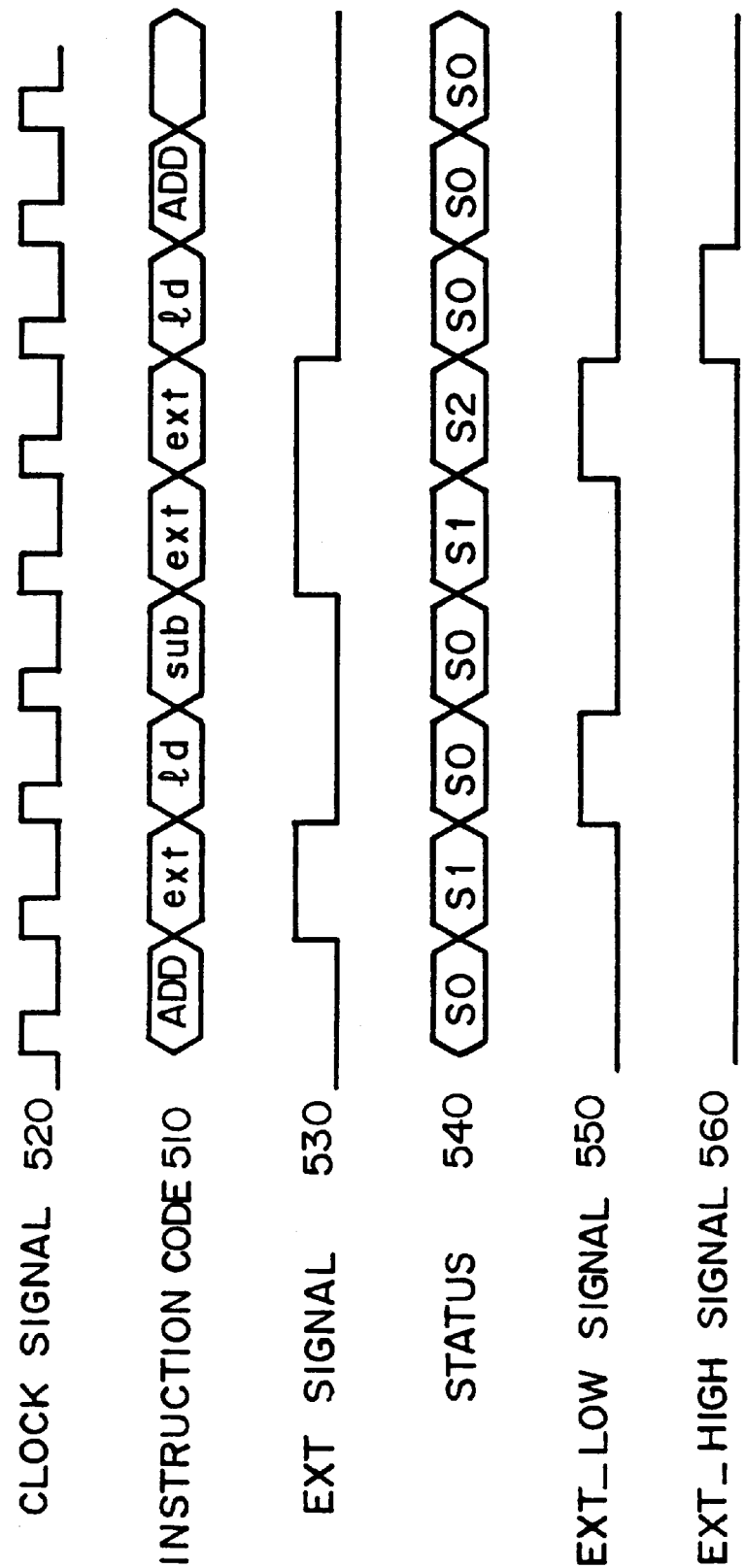
FIG. 5 is a timing chart of the relationships between the input instruction code, the status of the state machine, and the immediate data generation signals that are created by the signal generation circuit for the generation of immediate data.

The timing chart of FIG. 5 shows the relationships between the input instruction code, the status of the state machine, and the immediate data generation signals that are created by the signal generation circuit for the generation of immediate data.

The signals created by the signal generation circuit for the generation of immediate data are an ext signal 530, an ext_low signal 550, and an ext_high signal 560. Reference number 510 in FIG. 5 denotes an input instruction code and 540 denotes the status of the state machine. A clock signal 520 is a signal generated by a clock signal generator that is not shown in FIG. 2, or it is input through a clock input pin. The clock signal 520 is used for synchronizing the various operations within the CPU. An instruction address may be output to the instruction address bus 120 in synchronization with the rise of the clock signal 520, for example, similarly, an instruction code may be read from the ROM 110 on the basis of this instruction address during each period of the clock signal 520 (one machine cycle), and the instruction code is held in the instruction register 150. Each operation is completed within a machine cycle in accordance with the thus read instruction codes.

The ext signal 530 becomes 1 when an ext instruction is input, and is an input signal that changes the status of the state machine. In other words, the signal generation circuit for the generation of immediate data changes the ext signal 530 to 1 if the input instruction is an ext instruction, or changes the ext signal 530 to 0 if the input instruction is a standard instruction.

The ext_low signal 550 is output in accordance with the status of the state machine and is delayed by one clock cycle when the status is S1. In other words, the signal generation circuit for the generation of immediate data sets the ext_low signal 550 to 1 at the rise of the next clock signal 520 if the status is S1. The signal generation circuit for the generation of immediate data returns the ext_low signal 550 to 0 at the rise of the clock signal after that.

The ext_high signal 560 is output in accordance with the status of the state machine and is delayed by one clock cycle when the status is S2. In other words, the signal generation circuit for the generation of immediate data sets the ext_high signal 560 to 1 at the rise of the next clock signal 520 if the status is S2. The signal generation circuit for the generation of immediate data then returns the ext_high signal 560 to 0 at the rise of the clock signal after that.

Figure 6:
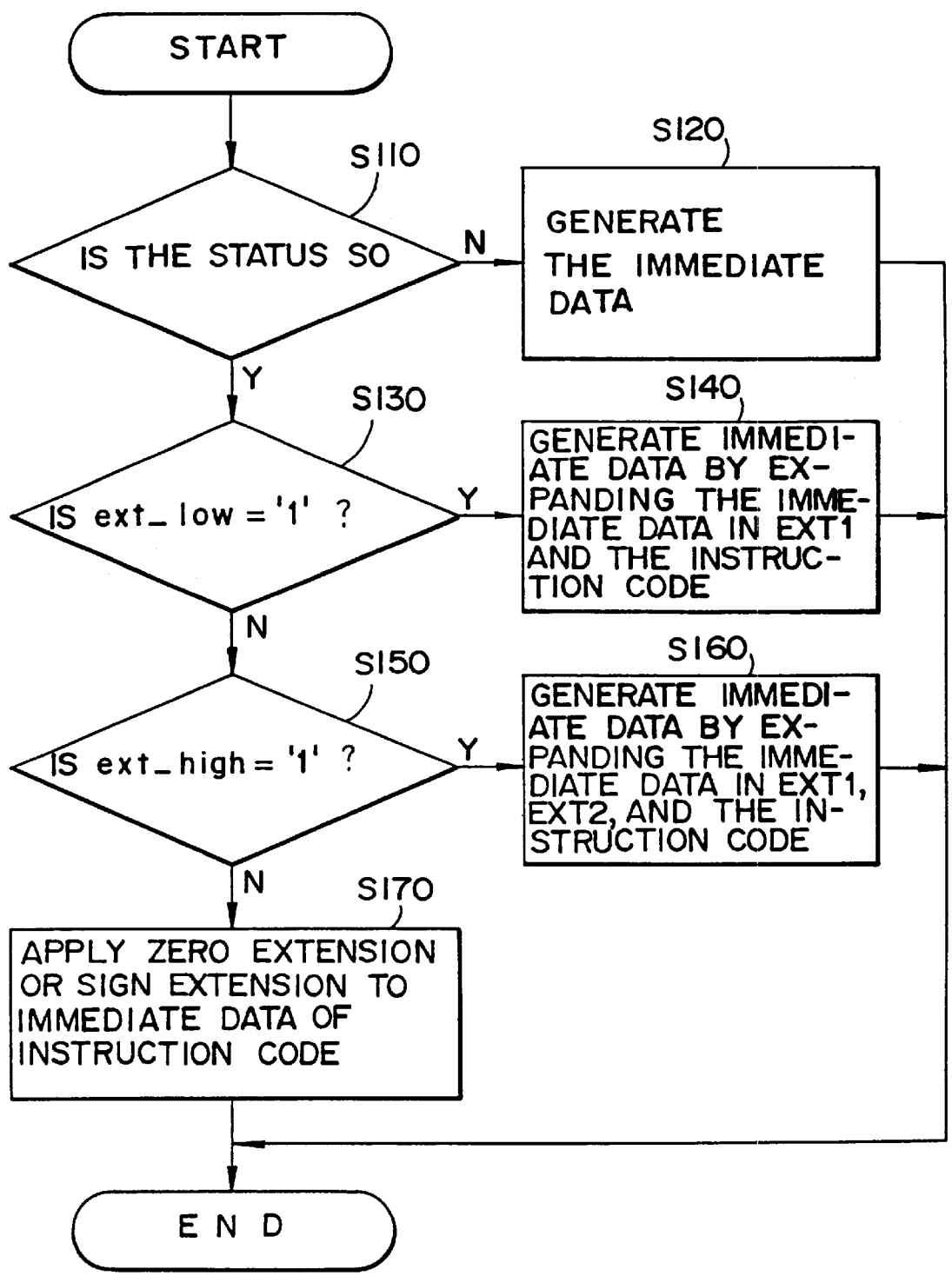
FIG. 6 is a flowchart of the algorithm used by the immediate data generation circuit for expanding immediate data based on the status of the state machine and the immediate data generation signal.

FIG. 6 is a flowchart of the algorithm used by the immediate data generation circuit for expanding immediate data on the basis of the status of the state machine and the immediate data generation signal, when there is immediate data in the instruction code.

If the status of the state machine is determined not to be S0 (step 110), this is the status in which the CPU processes an ext instruction that is a prefix instruction but not a standard instruction. In that case, the immediate data generation circuit 170 does not generate any immediate data (step 120). The prefix instruction itself is not subject to the calculations performed by the ALU in the instruction execution section 60. Therefore, it is not necessary to generate immediate data which is done during the processing of the prefix instruction (when the status of the state machine is S1 or S2).

If the ext_low signal 550 is 1 with the status of the state machine at S0 (step 110), a standard instruction that is the target instruction is to be processed after a first ext instruction. In that case, 19 bits of immediate data are subjected to zero extension or sign extension to 32 bits (step 140). This immediate data consists of 13 bits of immediate data that is comprised within the instruction code for the previous ext instruction, which is held in the EXT1 register 172, connected to 6 bits of immediate data that is comprised within the instruction code Of this target instruction, which is input over a immediate data generation signal line 176.

If the ext_high signal 560 is 1 with the status of the state machine at S0 (step 150), a standard instruction that is the target instruction is to be processed after a sequence of a plurality of ext instructions. In that case, 32 bits of immediate data are generated (step 160). This immediate data consists of 13 bits of immediate data comprised within the instruction code of the first ext instruction, which is held in the EXT1 register 172, plus 13 bits of immediate data comprised within the instruction code of the final ext instruction, which is held in the EXT2 register 174, plus 6 bits of immediate data comprised within the instruction code of the target instruction, which is input over the immediate data generation signal line 176.

If both the ext_low signal 550 and ext_high signal 560 are 0 with the status of the state machine at S0, a standard instruction that is not a target instruction (the immediately preceding instruction was a standard instruction, not an ext instruction) is to be processed. In that case, 6 bits of immediate data comprised within the instruction code of that standard instruction, which is input over the immediate data generation signal line 176, is subjected to zero extension or sign extension (step 170).

In this manner, the instruction decoder circuit 160 and the immediate data generation circuit 170 function as immediate-data expansion means to increase the number of bits of immediate data in the subsequent target instruction, using the immediate data of the ext instruction.

Note that this processing occurs when there is immediate data within the instruction code. However, this processing can also be applied as appropriate even when there is no immediate data in the instruction code, wherein the processing of steps 140 and 160 is modified to not use immediate data from the instruction codes and the processing of step 170 is omitted.

By executing a plurality of ext instructions in sequence, the operational details of the second and subsequent ext instructions can be expanded. In other words, the above-described configuration allows the instruction decoder circuit 160, the immediate data generation circuit 170, the EXT1 register 172, and the EXT2 register 174 to function as a prefix instruction function expansion means to expand and decode the operational details of prefix instructions, depending on the number of sequentially input prefix instructions.

3. Specific Example of Use of Ext Instruction (Prefix Instruction) To Expand Immediate Data in Target Instruction The description now turns to a typical embodiment illustrating the immediate data expansion provided by the ext instruction of this invention. This example refers to a type of instruction wherein immediate data and a general register are specified in the instruction code and a calculation is performed on that immediate data and the value stored in the general register (hereinafter called a "type-1 instruction").

Figure 7A:
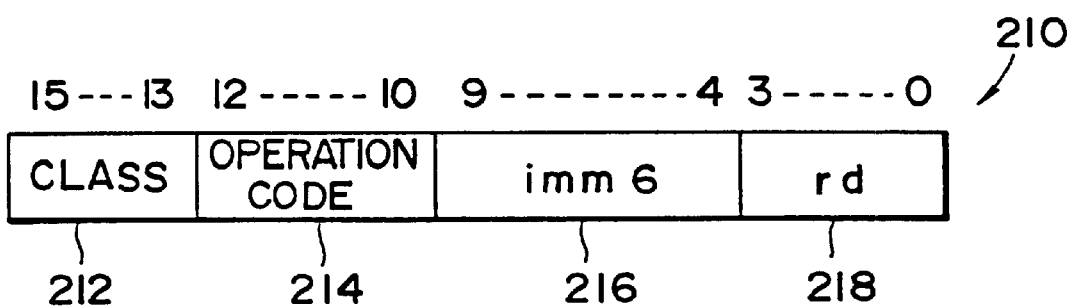
FIGS. 7A and 7B show the bit fields of instruction codes of a type-1 instruction and an ext instruction.
Figure 7B:
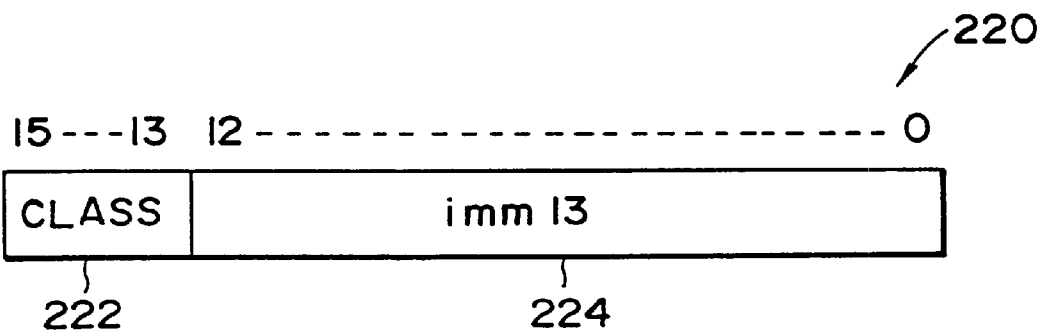

The structure of the type-1 instruction and the instruction code of the ext instruction will first be described. The bit fields of instruction code 210 of such a type-1 instruction are shown in FIG. 7A and the bit fields of instruction code 220 of an ext instruction are shown in FIG. 7B. The numbers above each bit field refer to bit positions and each of the instruction codes shown in FIGS. 7A and 7B have a 16-bit width of fields, from bit 15 to bit 0.

The instruction code 210 of the type-1 instruction shown in FIG. 7A consists of a 3-bit class specification region 212 from bit 15 to bit 13, a 3-bit region 214 from bit 12 to bit 10 that specifies the operation code, a 6-bit region 216 from bit 9 to bit 4 that specifies immediate data, and a 4-bit register specification region 218 from bit 3 to bit 0.

The class specification region 212 defines the group of this instruction. Instructions-used by this microcomputer are divided into groups according to predetermined rules, so the class specification region is necessary to specify the group to which each instruction belongs.

The region 214 that specifies the operation code contains operation code defining the operating function of that instruction. Note that each operation code is determined to belong to a specific class, so the op-code specification region 214 contains operation code that belongs to the class specified in the class specification region 212.

The immediate-data specification region 216 contains a 6-bit immediate data item (imm6) and the register specification region 218 contains a code indicating one of the general registers (rd).

A type-1 instruction performs the calculation specified by the operation code, using the immediate data (imm6) and the general register (rd), then writes the result to that general register (rd)

The instruction code 220 of the ext instruction shown in FIG. 78 consists of a 3-bit class specification region 222 from bit 15 to bit 13 and a 13-bit region 224 from bit 12 to bit 0 specifying immediate data. This immediate-data specification region contains a 13-bit immediate data item (imm13).

This ext instruction does not have operation code, but the prefix instruction processed by the microcomputer of this embodiment is only one type of ext instruction. The prefix instruction is allocated to a predetermined class, so it is possible to identify this as an ext instruction by the class specified in the class specification region 222.

Since the ext instruction is a prefix instruction, it does not execute any operation independently by the ALU in the CPU, but it acts to expand the immediate data used by a target instruction that is executed subsequently. If, for example, a target instruction such as a type-1 instruction has instruction code comprising immediate data and is the target of an ext instruction, the immediate data comprised within the instruction code of the type-1 instruction is expanded by using 6-bit immediate data (imm6) of the ext instruction, during the execution of the type-1 instruction.

The description now turns to details of the expansion of immediate data during the execution of this type-1 instruction.

The first part of the description concerns the case in which a type-1 instruction is executed independently. The type-1 instruction is first input from the ROM 110 of FIG. 2, over the instruction address bus 120 to the instruction register 150. The instruction is decoded by the instruction decoder circuit 160 and calculations are performed in accordance with the details thereof. With a type-1 instruction, the data stored in the general register (rd) specified by the instruction code is input from the register file 90 over a data bus 182 to the ALU 190. The immediate data (imm6) specified by the instruction code is separated by the instruction decoder circuit and is input to the immediate data generation circuit 170 over the immediate data generation signal line 176. The immediate data generation circuit 170 subjects this immediate data (imm6) to 32 bits by zero extension or sign extension, and the thus expanded immediate data is input to the ALU 190. The ALU 190 performs the calculation indicated by the operation code of the type-1 instruction, then stores the result in the general register (rd) of the register file 90, via a data bus 192.

This type-1 instruction can be executed independently or it can be executed in combination with one or a plurality of ext instructions immediately preceding the type-1 instruction. The execution of a type-1 instruction in combination with one or more ext instructions is basically the same as that of independent execution, except for a difference in the process of generating the immediate data expanded by the immediate data (imm6) extracted by the instruction decoder circuit. That is, when a type-1 instruction is executed in combination with one or more ext instructions, the expansion of imm6 concerns the immediate data of the previous ext instruction, which is held in the EXT1 and EXT2 registers 172 and 174. This process and the process of storing the immediate data of the ext instruction in the EXT1 and EXT2 registers 172 and 174, before this process, are as shown in FIGS. 3 to 6. The expanded immediate data generated by the immediate data generation circuit 170 differs according to whether the type-1 instruction is executed independently or in combination with one or more ext instructions preceding it.

Figure 8A:
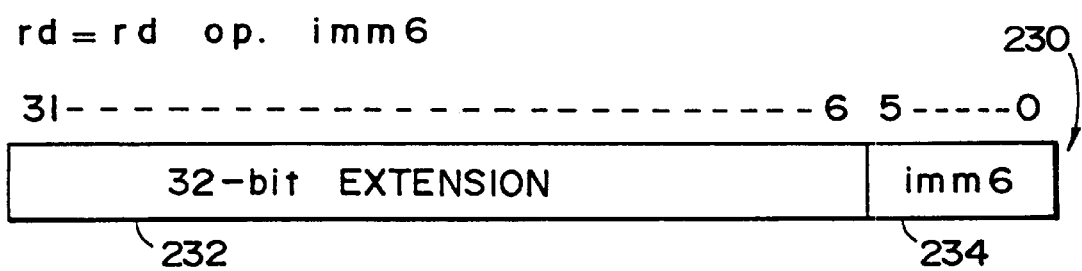
FIGS. 8A to 8C illustrate equations that express operations and the fields of expanded immediate data used in the execution of these operations.
Figure 8B:
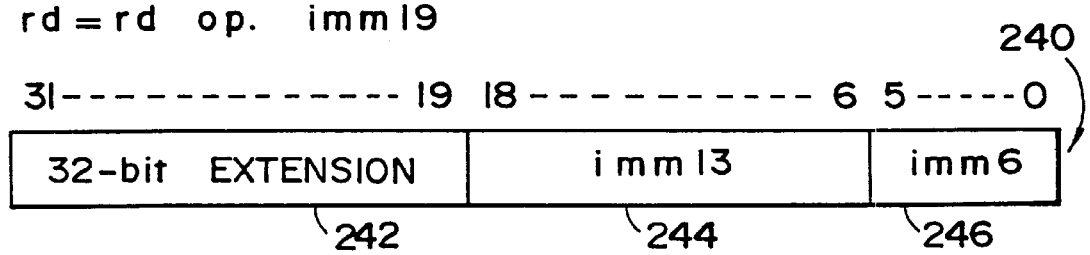
Figure 8C:
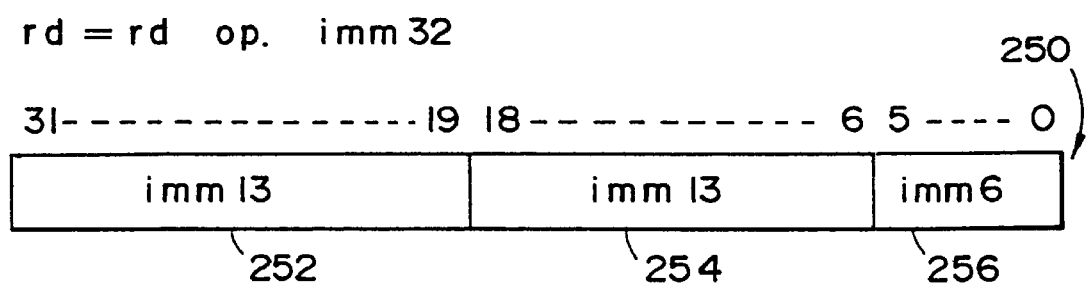

Equations expressing the operations in these cases and the fields of expanded immediate data used in the execution of these operations are shown in FIGS. 8A to 8C.

FIG. 8A shows the operation when a type-1 instruction is executed independently, illustrating the bit fields for expanded immediate data 230 used in the execution. In this figure, the 6-bit immediate data (imm6) of the type-1 instruction is expanded by either zero extension or sign extension to form 32-bit immediate data 230. After zero extension, a region 232 from bit 6 to bit 31 is all zeros; after sign extension, that region from bit 6 to bit 31 is filled with the highest order bit of imm6, that is, all these bits are the same as bit 5.

FIG. 8B shows the operation when a type-1 instruction is executed in combination with an immediately preceding ext instruction, illustrating the bit fields for expanded immediate data 240 used in the execution. In this figure, the 6-bit immediate data (imm6) of the type-1 instruction is set in a field 246 that extends from bit 5 to bit 0 and the 13-bit immediate data (imm13) of the immediately preceding ext instruction is set in bits 18 to 6, to create 19-bit immediate data (imm19). This 19-bit immediate data (imm19) is expanded by either zero extension or sign extension to form 32-bit immediate data 240. After zero extension, a region 242 from bit 19 to bit 31 is all zeros; after sign extension, the region 244 from bit 19 to bit 31 is filled with the highest order bit of imm19, that is, all these bits are the same as bit 18.

FIG. 8C shows the operation when a type-1 instruction is executed in combination with a second ext instruction, illustrating the bit fields for expanded immediate data 250 used in the execution. In this figure, the 6-bit immediate data (imm6) of the type-1 instruction is set in a field 256 that extends from bit 5 to bit 0, the 13-bit immediate data (imm13) of the first ext instruction is set in bits 31 to 19, and the 13-bit immediate data (imm13) of the second ext instruction is set in bits 18 to 6, to create 32-bit immediate data (imm32) 250.

Note that, when two or more ext instructions are executed in combination, the configuration is such that the initial and final ext instructions are valid. In other words, the initial ext instruction has the same function as the first ext instruction and the final ext instruction has the same function as the second ext instruction.

4. Specific Example of Use of Prefix Instruction To Expand Operational Details of Target Instruction The description now turns to a typical embodiment illustrating the target instruction operational detail expansion provided by the prefix instruction of this invention. This example refers to a type of instruction wherein two general registers are used for a calculation (hereinafter called a "type-2 instructions").

The structure of the instruction code of the type-2 instruction will first be described. The bit fields of instruction code 260 of this type-2 instruction are shown in FIG. 9.

Figure 9:
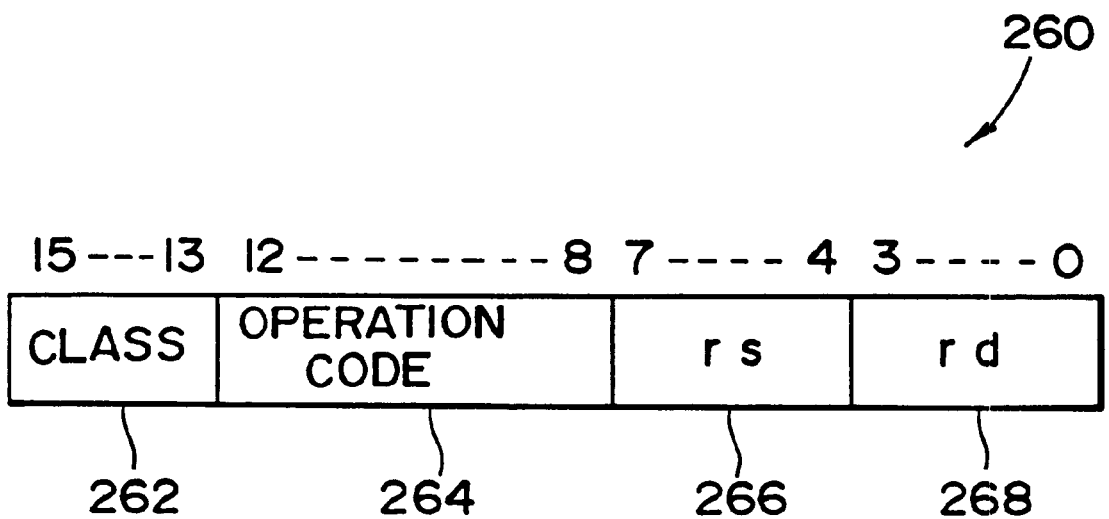
FIG. 9 shows the bit fields of the instruction code of a type-2 instruction.

The instruction code 260 of the type-2 instruction shown in FIG. 9 consists of a 3-bit class specification region 262 from bit 15 to bit 13, a 5-bit region 264 from bit 12 to bit 8 that specifies the operation code, a 4-bit register specification region 266 from bit 7 to bit 4, and another 4-bit register specification region 268 from bit 3 to bit 0.

Each of the register specification regions 266 and 268 contains codes indicating general register (rs) and (rd). In this case, rs is a register source and rd is a register destination. A type-2 instruction is a two-operand instruction that performs the calculation specified by the operation code, using data stored in the general register (rs) and the general register (rd), then writes the result to the general register (rd).

The description now turns to the operation of the CPU when executing a type-2 instruction independently. The type-2 instruction is first input from the ROM 110 of FIG. 2, over the instruction data bus 130 to the instruction register 150. The instruction is decoded by the instruction decoder circuit 160 and calculations are performed in accordance with the details thereof. With a type-2 instruction, the data stored in the general register (rd) specified by the instruction code is input from the register file 90 over the data bus 182 to the ALU 190. Furthermore, the data stored in the general register (rs) specified by the instruction code is input from the register file 90 over the data bus 184 to the ALU 190. The ALU 190 performs the calculation indicated by the operation code of the type-2 instruction, then stores the calculation result in the general register (rd) of the register file 90, via the data bus 192.

This type-1 instruction can be executed independently or it can be executed in combination with one or a plurality of ext instructions immediately preceding it.

Equations expressing the operations of executing the type-2 instruction independently or in combination with an immediately preceding first or second ext instruction are shown in FIGS. 10A to 10C, together with the bit fields of immediate data used in the execution.

FIG. 10A shows the operation when a type-2 instruction is executed independently. In this case, the operation is the same as in the prior art, so no immediate data is used. Note that further details of the independent execution of a type-2 instruction is as described above.

FIG. 10B shows the operation when a type-2 instruction is executed in combination with an immediately preceding ext instruction, illustrating the bit fields for expanded immediate data 270 used in the execution. As shown in this figure, when a type-2 instruction has been executed in combination with an immediately preceding ext instruction, the operational details are expanded in such a manner that the result of a calculation with respect to the immediate data (imm13) generated on the basis of the ext instruction and the contents of the general register (rs) is overwritten into the general register (rd). The immediate data 270 is the immediate data (imm13) from within the ext instruction, expanded to 32 bits by zero extension.

The description now concerns a type-2 instruction executed in combination with one ext instruction. The type-2 instruction is first input from the ROM 110 of FIG. 2, over the instruction data bus 130 to the instruction register 150. The instruction is decoded by the instruction decoder circuit 160 and, if that instruction is determined to be a target instruction (if the status of the state machine is not S0) the operation is as follows. The data stored in the general register (rs) specified by the instruction code is input from the register file 90 over the data bus 182 to the ALU 190. The immediate data (imm13) of the immediately preceding ext instruction, which is held in the EXT1 register 172, is subjected to zero extension by the immediate data generation circuit 170 to form the immediate data 270, and is input to the ALU 190. The ALU 190 performs the calculation indicated by the operation code of the type-2 instruction, then stores the result in the general register (rd) of the register file 90, via the data buses 192.

Note that the process of using immediate data of the previous ext instruction, held in the EXT1 and EXT2 registers 172 and 174, to generate the immediate data used in the execution of the type-2 instruction and the process of storing the immediate data of the ext instruction in the EXT1 and EXT2 registers 172 and 174, before this process, are as shown in FIGS. 3 to 6.

Thus the effect of executing a type-2 instruction in combination with an ext instruction is the same as executing a three-operand instruction having immediate data and the contents of two general registers as operands.

FIG. 10C shows the operation when a type-2 instruction is executed in combination with a second ext instruction, illustrating the bit fields for expanded immediate data 280 used in the execution. As shown in this figure, when a type-2 instruction is executed in combination with a second ext instruction, a calculation result obtained from immediate data (imm26) created on the basis of the second ext instruction and the contents of the general register (rs) is written into the general register (rd) to expand the operational details. The immediate data 280 is created by setting the immediate data imm13 comprised within the first ext instruction in bits 25 to 13 and the immediate data comprised within the second ext instruction in bits 12 to 0, then expanding the resultant imm26 to 32 bits by zero extension or sign extension.

Note that, when two or more ext instructions are executed in combination, the configuration is such that the initial and final ext instructions are valid. In other words, the initial ext instruction has the same function as the first ext instruction and the final ext instruction has the same function as the second ext instruction.

The execution of a type-2 instruction in combination with two or more ext instructions is basically the same as that of execution in combination with a first ext instruction, except for a difference in the process by which the immediate data generation circuit 170 generates the immediate data 280.

In other words, the immediate data generation circuit 170 uses the immediate data (imm13) of the first ext instruction, which is stored in the EXT1 register 172, and the immediate data (imm13) of the final ext instruction, which is stored in the EXT2 register 174, to generate the immediate data 280.

Note that the process of using immediate data of the previous ext instruction, held in the EXT1 and EXT2 registers 172 and 174, to generate the immediate data used in the execution of the type-2 instruction and the process of storing the immediate data of the ext instruction in the EXT1 and EXT2 registers 172 and 174, before this process, are as shown in FIGS. 3 to 6.

To ensure that the ext instruction can be used in this manner to enable the expansion of operational details of the target instruction, the instruction decoder circuit and immediate data generation circuit function as a target instruction function expansion-means.

When a type-2 instruction is executed in combination with two or more ext instructions, the sequence of 13-bit immediate data items (imm13) from the two ext instructions can be used as immediate data after zero extension or sign extension, so that the immediate data has a greater number of bits than that obtained by execution in combination with one ext instruction.

To ensure that the functionality is expanded more when a type-2 instruction is executed in combination with two or more ext instructions than when it is executed in combination with a first ext instruction, the instruction decoder circuit and immediate data generation circuit function as a prefix instruction function expansion means.

Figure 11:
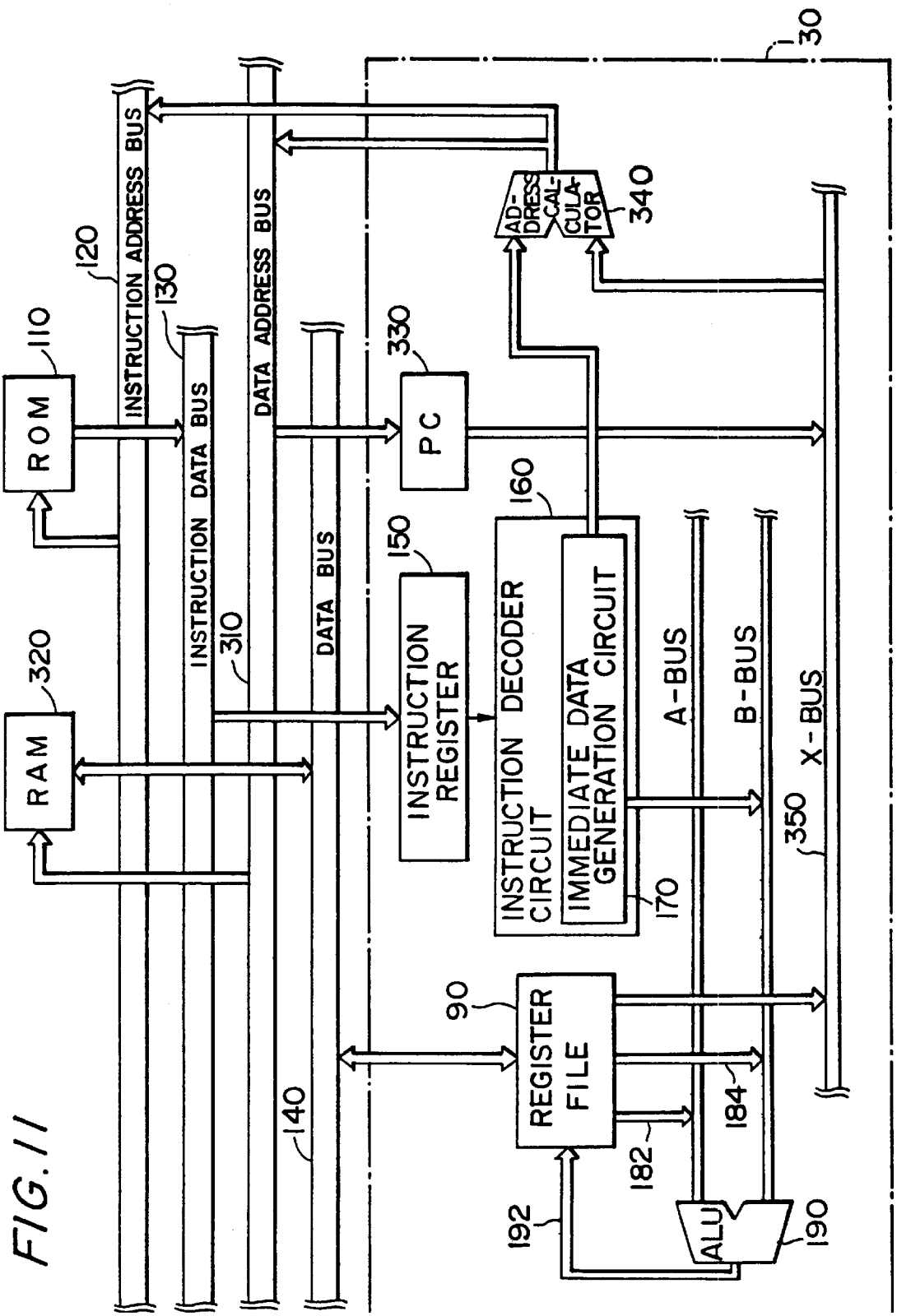
FIG. 11 shows portions essential for the description of the configuration of a semiconductor integrated circuit incorporated in a microcomputer.

5. Specific Example of Use of Prefix Instruction To Expand Immediate Data of Address of Target Instruction The description now turns to the use of the prefix instruction of this invention to expand an address during the execution of a target instruction. Portions that are essential for describing the configuration of a semiconductor integrated circuit incorporated within this microcomputer are shown in FIG. 11. The configuration is basically the same as that of FIG. 2, and portions thereof that have the same functions as components in FIG. 2 are given the same reference numbers. Note that components such as the EXT1 register 172 of FIG. 2 have been omitted for the sake of simplicity, so that only the instruction decoder circuit 160 and the immediate data generation circuit 170 are shown. In addition to the components of FIG. 2, this figure shows RAM 320, a program counter (PC) 330, an address calculator 340, and an X-bus 350. It should be noted that the program counter (PC) 330 and the register file 90 are shown separately in this figure. The address calculator 340 usually performs all types of calculations such as arithmetic, logical or shift calculations, but in this specific example only the addition capability thereof is described, for the sake of simplicity.

The RAM 320 stores data used for execution. The address calculator 340 calculates the address of data stored in the RAM 320, and is configured to input the immediate data generated by the immediate data generation circuit 170, the value in the program counter (PC) 330, and values stored in the register file 90. The address of the instruction that is currently executing is stored in the program counter (PC) 330. The address calculated by the address calculator 340 specifies either an address in the RAM 320 via the data address bus 310 the address of an instruction in the ROM 110 via the instruction address bus 120. The data or instruction at the address specified by the address bus 310 or 120 is input to the CPU 30 over the data bus 140 or the instruction data bus 130.

The description now turns to the expansion of immediate data at an address given by a prefix instruction, using a type of instruction which has immediate data at an address in an operand and which uses a relative address calculated from that immediate data and address value stored in the program counter (PC) 330 (hereinafter called a "type-3 instruction").

Figure 12:
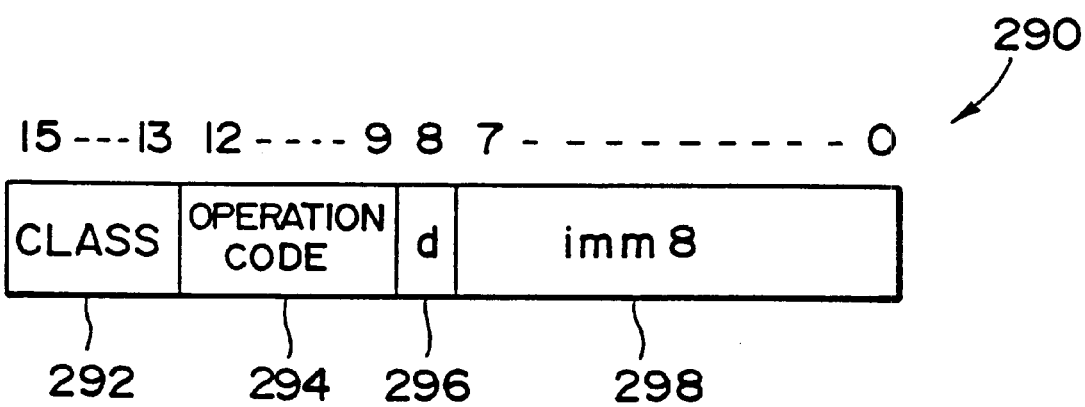
FIG. 12 shows the bit fields of the instruction code of a type-3 instruction.

The bit fields of the instruction code 290 for a PC-relative subroutine call instruction (an instruction that calls a subroutine by a relative address), which is an example of a type-3 instruction, are shown in FIG. 12. The instruction code 290 of the type-3 instruction shown in FIG. 12 consists of a 3-bit class specification region 292 from bit 15 to bit 13, a 4-bit region 294 from bit 12 to bit 9 that specifies the operation code, a d-bit region 296 at bit 8 that specifies a bit that supplements the predetermined operation codes and an 8-bit region 298 from bit 7 to bit 0 that specifies immediate data.

This PC-relative subroutine call instruction shifts the 8-bit immediate data (imm8) stored in the immediate-data specification region 298 one bit to the left to form 9-bit data (sin9). The 9-bit data is expanded to 32-bit immediate data by sign extension, and added to the value in the PC to create an address. The PC-relative subroutine call instruction branches the resultant address.

The description now turns to the operation of the CPU when executing this PC-relative subroutine call instruction independently, with reference to FIG. 11. The 8-bit immediate data comprised within the instruction code is shifted one bit to the left by the immediate data generation circuit 170 then is expanded by sign extension to form 32-bit immediate data (sign9). That 32-bit immediate data (sign9) is input to the address calculator 340. The address stored in the program counter (PC) 330 is also input to the address calculator 340. The address calculator 340 adds the immediate data (sign9) and the address stored in the program counter (PC) 330 to create a branch address. The subroutine stored at that branch address is then executed.

A type-3 instruction such as this PC-relative subroutine call instruction can be executed independently or it can be executed in combination with one or a plurality of ext instructions immediately preceding it. The execution in combination with ext instructions is basically the same as that of independent execution, except for a difference in the process by which the expanded immediate data is generated by the immediate data generation circuit 170 of the instruction decoder circuit 160 from the immediate data (imm8) extracted from the instruction code. That is, during execution in combination with ext instructions, the expansion of imm8 concerns the immediate data of the previous ext instruction, which is held in the EXT1 and EXT2 registers 172 and 174. This process and the process of storing the immediate data of the ext instruction in the EXT1 and EXT2 registers 172 and 174, before this process, are as shown in FIGS. 3 to 6. Therefore, the pre-branch address can be recreated by executing the type-3 instruction either independently or in combination with one or more ext instructions preceding it.

Figure 13A:
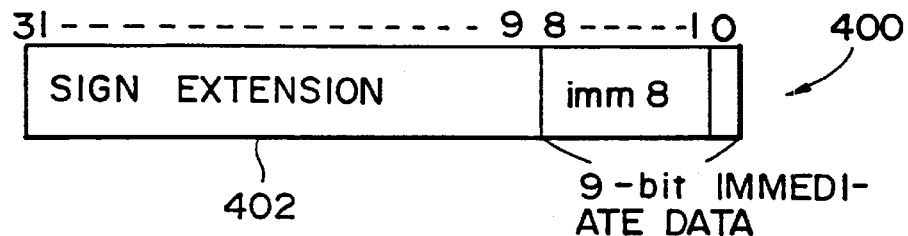
FIGS. 13A to 13C illustrate equations that express operations of type-3 instructions and the bit fields of immediate data used in the execution of these operations.
Figure 13B:
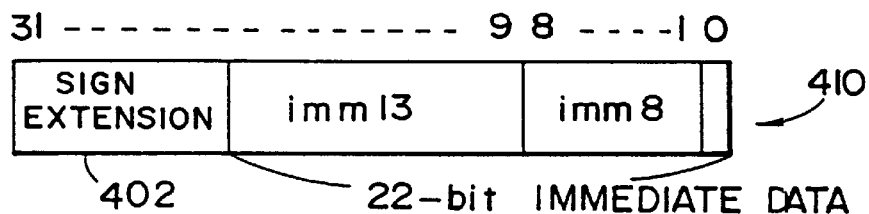
Figure 13C:
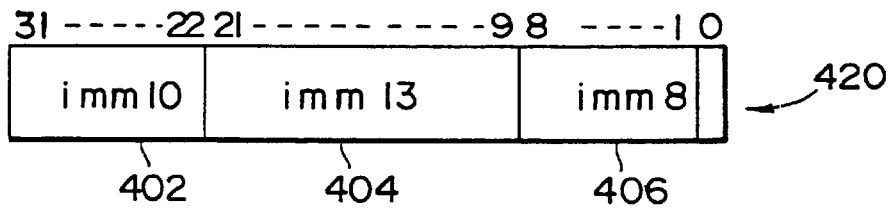

Equations expressing the operations of the type-3 instruction in these cases and the fields of expanded immediate data used in the execution of these operations are shown in FIGS. 13A to 13C.

FIG. 13A shows the operation when a type-3 instruction is executed independently, illustrating the bit fields for expanded immediate data 400 used in the execution. Since the CPU 30 uses 16-bit fixed-length instruction codes, the instruction address is always at an even-numbered byte address, and thus the least significant bit of the instruction address is always zero. Therefore, during the expansion, the 8-bit immediate data (imm8) is shifted one bit to the left to become 9-bit immediate data, as shown in this figure. The 9-9-9-bit immediate data is expanded by sign extension to form the 32-bit immediate data 400 (sign9).

FIG. 13B shows the operation when a type-3 instruction is executed in combination with an immediately preceding ext instruction, illustrating the bit fields for expanded immediate data 410 used in the execution. As shown in this figure, 21-bit immediate data formed by linking the 8-bit immediate data (imm8) of the type-3 instruction and the 13-bit immediate data (imm13) of the ext instruction is shifted one bit to the left to form 22-bit immediate data. This 22-bit immediate data is expanded by sign extension to form the 32-bit immediate data 410 (sign22).

FIG. 13C shows the operation when a type-3 instruction is executed in combination with a second ext instruction, illustrating the bit fields for expanded immediate data 420 used in the execution. As shown in this figure, 31-bit immediate data formed by linking the 8-bit immediate data (imm8) of the type-3 instruction, the 10-bit immediate data (imm10) of the first ext instruction, and the 13-bit immediate data (imm13) of the second ext instruction is shifted one bit to the left to form 32-bit immediate data (sign32).

Note that, when two or more ext instructions are executed in combination, the configuration is such that the initial and final ext instructions are valid. In other words, the initial ext instruction has the same function as the first ext instruction and the final ext instruction has the same function as the second ext instruction.

6. Specific Example of Use of Prefix Instruction To Add Displacement to Target Instruction The description now turns to the use of a prefix instruction to add a displacement to an address, in an instruction of a type that does not have immediate data in an operand and executes by using an address stored in the register specified by that operand (hereinafter called a "type-4 instruction").

The configuration of the instruction code is similar to that of the type-2 instruction shown in FIG. 9 in that it has specification regions for two registers in operands. The ways in which the operation code differs do not affect the description of this embodiment, so details thereof are omitted. The example of the type-4 instruction described below is a load instruction. A load instruction loads data that is stored at the address specified by rs, into the register indicated by rd.

The description first concerns the operation of the CPU when the load instruction is executed independently. The CPU reads from the RAM 320 a value stored at the address stored in the general register (rs) that is to become an address, and stores it in the general register (rd) specified by the instruction code.

A type-4 instruction such as this load instruction can be executed independently or it can be executed in combination with one or a plurality of ext instructions immediately preceding it. The execution in-combination with ext instructions adds a displacement according to immediate data comprised within the instruction code of the ext instructions, for execution of the type-4 instruction.

Figure 14A:
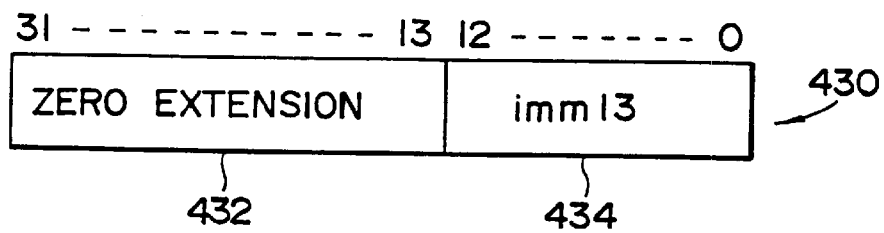
FIGS. 14A and 14B show displacements created when type-4 instructions are executed.
Figure 14B:
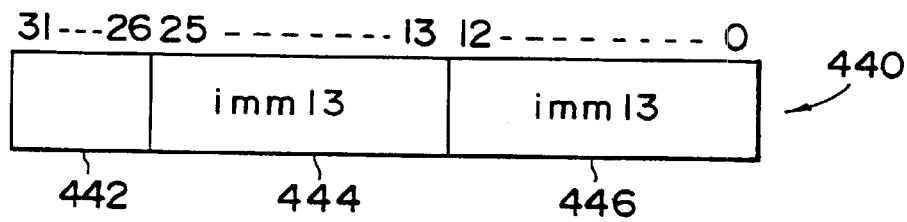

Displacements created when a type-4 instruction is executed in combination with an immediately preceding first or second ext instruction are shown in FIGS. 14A and 14B.

FIG. 14A illustrates the displacement when a type-4 instruction is executed in combination with a first ext instruction. As shown in this figure, the immediate data (imm13) of the immediately preceding ext instruction is subjected to zero extension to form 32-bit immediate data (imm13) 430.

The execution of a type-4 instruction in combination with an ext instruction will now be described with reference to FIG. 11. The type-4 instruction is first input from the ROM 110 to the instruction register 150, over the instruction data bus 130. The instruction is decoded by the instruction decoder circuit 160 and, if that instruction is determined to be a target instruction (if the status of the state machine is not S0) the address stored in the general register (rs) specified by the instruction code is fetched from the register file 90 and input to the address calculator 340 over the X-bus 350.

The immediate data (imm13) of the immediately preceding ext instruction, which is held in the EXT1 register 172, is subjected to zero extension by the immediate data generation circuit 170 to form the 32-bit immediate data 430 and is input to the address calculator 340. The address calculator 340 adds these two inputs to create an address. The thus created address is used to specify an address in the RAM 320 over the data address bus 310, and the data stored at that address is input to the register file 90 over the data bus 140 and is stored in the general register (rd) specified by the instruction code.

FIG. 14B illustrates the displacement when the type-4 instruction is executed in combination with a second ext instruction. As shown in this figure, the immediate data (imm13) of the first ext instruction is set in a 13-bit field 444 from bit 25 to bit 13 and the immediate data (imm13) of the second ext instruction is set in a 13-bit field 446 from bit 12 to bit 0, and the result is expanded by zero extension to create the 32-bit immediate data 440 (imm26).

The execution of a type-4 instruction in combination with a second ext instruction will now be described with reference to FIG. 11. The operation in this case is basically the same as that of execution in combination with a first ext instruction, except that the immediate data that creates the displacement is different. During execution in combination with a second ext instruction, the immediate data of the second ext instruction, which is held in the EXT1 and EXT2 registers 172 and 174, is used to form the immediate data 440 shown in FIG. 14B, and that immediate data 440 is input as a displacement to the address calculator 340. Note that the process of using immediate data of the previous ext instruction, held in the EXT1 and EXT2 registers 172 and 174, to generate the immediate data used in the execution of the type-4 instruction and the process of storing the immediate data of the ext instruction in the EXT1 and EXT2 registers 172 and 174, before this process, are as shown in FIGS. 3 to 6.

Thus the operational details are expanded in such a manner that a displacement is added to an operand, during the execution of a type-4 instruction in combination with ext instructions.

Embodiment 2

Figure 15:
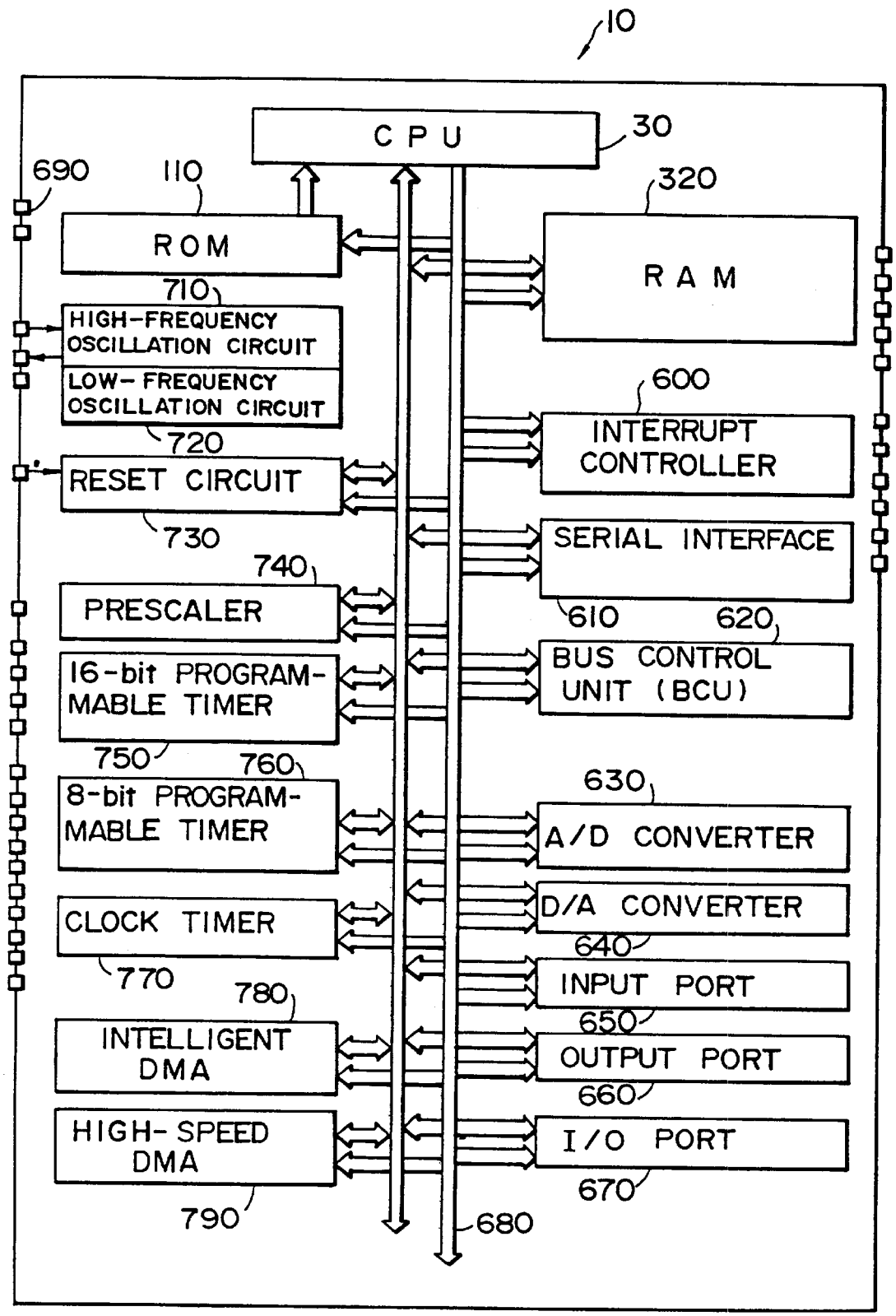
FIG. 15 is a hardware block diagram of a microcomputer in accordance with a second embodiment of this invention.

A block diagram of the hardware of the microcomputer of this embodiment is shown in FIG. 15.

This microcomputer 10 is a 32-bit microcontroller that comprises the CPU 30, the ROM 110, the RAM 320, a high-frequency oscillation circuit 710, a low-frequency oscillation circuit 720, a reset circuit 730, a prescaler 740, a 16-bit programmable timer 750, an 8-bit programmable timer 760, a clock timer 770, an intelligent DMA 780, a high-speed DMA 790, an interrupt controller 600, a serial interface 610, a bus control unit (BCU) 620, an A/D converter 630, a D/A converter 640, an input port 650, an output port 660, an I/O port 670, as well as buses such as a bus 680 connecting these components and pins 690.

The CPU 30 processes 16-bit fixed-length instruction codes, but the data size during execution is 32 bits. This CPU 30 has the configuration shown in Embodiment 1 and functions as instruction code analysis means, immediate-data expansion means, target instruction function expansion means, prefix instruction function expansion means, and instruction execution means.

It is therefore possible to handle large blocks of immediate data and implement a three-operand instruction that cannot otherwise be written with short instruction coding, even when 16-bit instruction codes are used, thus providing a microcomputer that uses memory efficiently. If that microcomputer is configured as a semiconductor integrated circuit and the number of instructions is kept the same, the capacity of memory required can be half that of a microcomputer in which fixed-length instruction codes of a 32-bit width are used. This makes it possible to design a semiconductor integrated circuit device which a smaller chip size and a good yield.

The microcomputer of this invention could be applied to various types of electronic equipment, such as a printer or other peripheral device for a personal computer or portable electronic equipment. Since this configuration makes it possible to incorporate a data processing circuit therein that has a simple structure and uses memory efficiently, an inexpensive but sophisticated electronic device can be provided.

It should be noted that this invention is not limited to the embodiments described herein; it can be embodied in many various ways.

For example, the above described embodiments are particularly effective examples of applications that concentrate on increasing the efficiency with which memory is used. That is, the descriptions above relate to examples that use 16-bit fixed-length instruction codes in a CPU or microcomputer that is capable of processing 32-bit data, but the present invention is not limited thereto. This invention can equally well be applied to any type of CPU or microcomputer, regardless of the number of bits it can process or the number of bits in the instruction codes thereof. Similarly, the present invention can be applied regardless of whether or not the instruction codes are of fixed length.

Use of the present invention makes it possible to provide a CPU or microcomputer of a simple structure wherein the immediate data of instruction codes can be expanded and operational details can be modified easily.

The above embodiments were described as functioning with only the first and final ext instructions of a sequence of two or more ext instructions being valid, but the configuration could be such that three or more ext instructions are valid. The selection of ext instructions to validate is not limited to the first and final ext instructions, and it can be determined by any predetermined rules.

Examples of the modification of the function of an ext instruction by the execution of a plurality of ext instructions in combination is also not limited to those described above.

Similarly, the prefix instruction was described above by way of example as being only one type of ext instruction, but a plurality of different types of prefix instruction could also be envisioned.

What is claimed is:

1. A data processing circuit to which are input a certain target instruction and a prefix instruction for expanding the function of said target instruction, comprising:

instruction code analysis means for inputting said prefix instruction, subsequently inputting said target instruction, and analyzing the operation details of instruction code thereof; and instruction execution means for executing said instructions based on said operational details analyzed by said instruction code analysis means, wherein:

said instruction code analysis means comprises immediate-data expansion means for expanding immediate data necessary for the execution of the target instruction which is subjected to function expansion by said prefix instruction based on said prefix instruction, said instruction execution means executes said target instruction based on immediate data expanded by said immediate-data expansion means, said instruction code analysis means comprises target instruction function expansion means for analyzing operational details of a target instruction when said target instruction is input after the input of a prefix instruction, and said instruction execution means executes said target instruction in accordance with said operational details expanded by said target instruction function expansion means, wherein said target instruction function expansion means uses two operands of said target instruction and immediate data comprised within said prefix instruction to expand the operational details of said target instruction into a three-operand instruction, when a predetermined target instruction that is a two-operand instruction is input after the input of a prefix instruction.

2. The data processing circuit as defined in claim 1, wherein said instruction code analysis means comprises a prefix instruction function expansion means for expanding the operational details of said prefix instruction based on the number of sequentially input prefix instructions.

3. A data processing circuit to which are input a certain target instruction and a prefix instruction for expanding the function of said target instruction, comprising:

instruction code analysis means for inputting said prefix instruction, subsequently inputting said target instruction, and analyzing the operation details of instruction code thereof; and instruction execution means for executing said instructions based on said operational details analyzed by said instruction code analysis means, wherein:

said instruction code analysis means comprises immediate-data expansion means for expanding immediate data necessary for the execution of the target instruction which is subjected to function expansion by said prefix instruction based on said prefix instruction, said instruction execution means executes said target instruction based on immediate data expanded by said immediate-data expansion means, said instruction code analysis means comprises target instruction function expansion means for analyzing operational details of a target instruction when said target instruction is input after the input of a prefix instruction, and said instruction execution means executes said target instruction in accordance with said operational details expanded by said target instruction function expansion means, wherein said target instruction function expansion means performs at least one of an arithmetic calculation, a logic calculation, and a shift of one of data and an address stored in a register specified by the instruction code of said target instruction based on immediate data comprised within the instruction code of said prefix instruction so as to expand the operational details for execution, when a predetermined target instruction having a register-specifying value is input after the input of a prefix instruction.

4. The data processing circuit as defined in claim 3, wherein said instruction code analysis means comprises a prefix instruction function expansion means for expanding the operational details of said prefix instruction based on the number of sequentially input prefix instructions.

5. A data processing circuit to which are input a certain target instruction and a prefix instruction for expanding the function of said target instruction, comprising:

instruction code analysis means for inputting said prefix instruction, subsequently inputting said target instruction, and analyzing the operation details of instruction code thereof; and instruction execution means for executing said instructions based on said operational details analyzed by said instruction code analysis means, wherein:

said instruction code analysis means comprises immediate-data expansion means for expanding immediate data necessary for the execution of the target instruction which is subjected to function expansion by said prefix instruction based on said prefix instruction, said instruction execution means executes said target instruction based on immediate data expanded by said immediate-data expansion means, said instruction code analysis means comprises target instruction function expansion means for analyzing operational details of a target instruction when said target instruction is input after the input of a prefix instruction, and said instruction execution means executes said target instruction in accordance with said operational details expanded by said target instruction function expansion means, wherein said target instruction function expansion means creates a displacement for an address stored in a register specified in the instruction code of said target instruction based on immediate data comprised within the instruction code of said prefix instruction and uses said displacement to expand the operational details for execution, when a predetermined target instruction having a register-specifying value is input after the input of a prefix instruction.

6. The data processing circuit as defined in claim 5, wherein said instruction code analysis means comprises a prefix instruction function expansion means for expanding the operational details of said prefix instruction based on the number of sequentially input prefix instructions.

7. A data processing circuit to which are input different types of target instructions and a prefix instruction for expanding the function of said target instructions, comprising:

instruction code analysis means for inputting said prefix instruction, subsequently inputting said target instructions, and analyzing the operation details of instruction code thereof; and instruction execution means for executing said instructions based on said operational details analyzed by said instruction code analysis means, wherein:

said instruction code analysis means comprises immediate-data expansion means for expanding immediate data necessary for the execution of a target instruction which is subjected to function expansion by said prefix instruction based on said prefix instruction, said instruction execution means executes said target instruction based on immediate data expanded by said immediate-data expansion means, said instruction code analysis means comprises target instruction function expansion means for analyzing operational details of a target instruction depending on the type of target instruction when said target instruction is input after the input of a prefix instruction, and said instruction execution means executes said target instruction in accordance with said operational details expanded by said target instruction function expansion means.

8. The data processing circuit as defined in claim 7, wherein said instruction code analysis means comprises a prefix instruction function expansion means for expanding the operational details of said prefix instruction based on the number of sequentially input prefix instructions.

9. The data processing circuit as defined in claim 7, wherein the instruction codes of a plurality of prefix instructions include common codes for identifying prefix instructions.

10. The data processing circuit as defined in claim 9, wherein said instruction code analysis means comprises a prefix instruction function expansion means for expanding the operational details of said prefix instruction based on the number of sequentially input prefix instructions.

11. The data processing circuit as defined in claim 7, wherein said target instruction function expansion means uses two operands of said target instruction and immediate data comprised within said prefix instruction to expand the operational details of said target instruction into a three-operand instruction, when a predetermined target instruction that is a two-operand instruction is input after the input of a prefix instruction.

12. The data processing circuit as defined in claim 7, wherein said immediate-data expansion means uses immediate data comprised within the instruction code of said prefix instruction to expand data that is used during the execution of said target instruction but is not comprised within the instruction code of the target instruction.

13. The data processing circuit as defined in claim 7, wherein said immediate-data expansion means uses immediate data comprised within the instruction code of said prefix instruction to expand data that is used during the execution of said target instruction but is not comprised within the instruction code of the target instruction.

14. The data processing circuit as defined in claim 7, wherein said target instruction function expansion means modifies one of data and an address stored in a register specified by the instruction code of said target instruction based on immediate data comprised within the instruction code of said prefix instruction so as to expand the operational details for execution, when a predetermined target instruction having a register-specifying value is input after the input of a prefix instruction.

15. The data processing circuit as defined in claim 7, wherein said target instruction function expansion means creates a displacement for an address stored in a register specified in the instruction code of said target instruction based on immediate data comprised within the instruction code of said prefix instruction and uses said displacement to expand the operational details for execution, when a predetermined target instruction having a register-specifying value is input after the input of a prefix instruction.

16. A semiconductor integrated circuit comprising the data processing circuit of claim 7.

17. A microcomputer comprising the data processing circuit of claim 7.

18. The microcomputer defined in claim 7, wherein said microcomputer has a Reduced Instruction Set Computer architecture.

19. Electronic equipment controlled by the use of the microcomputer defined in claim 7.

* * * * *

UNITED STATES PATENT AND TRADEMARK OFFICE
CERTIFICATE OF CORRECTION

PATENT NO.   : 6,308,258 B1
DATED        : October 23, 2001
INVENTOR(S)  : Satoshi Kubota et al.

It is certified that error appears in the above-identified patent and that said Letters Patent is hereby corrected as shown below:

<u>Title page,</u>
Item [30], Foreign Application Priority Data

-- Dec. 20. 1995   (JP)......................................... 7-332207
   Dec. 16, 1996   (JP)......................................... 8-353167

Signed and Sealed this

Seventh Day of May, 2002

Attest:

JAMES E. ROGAN
*Attesting Officer*          *Director of the United States Patent and Trademark Office*